United States Patent
Lin

[19]

[11] Patent Number: 6,157,891
[45] Date of Patent: Dec. 5, 2000

[54] POSITIONING AND GROUND PROXIMITY WARNING METHOD AND SYSTEM THEREOF FOR VEHICLE

[76] Inventor: Ching-Fang Lin, 9131 Mason Ave., Chatsworth, Calif. 91311

[21] Appl. No.: 09/241,164

[22] Filed: Feb. 1, 1999

Related U.S. Application Data

[60] Provisional application No. 60/108,667, Nov. 16, 1998.

[51] Int. Cl.[7] .............................. G01S 5/02; G01S 13/08
[52] U.S. Cl. .................................. 701/301; 701/4; 701/9; 701/208; 701/213; 701/220; 244/180; 73/178 T; 342/63; 342/65; 342/26; 342/120; 342/194; 342/123; 342/357.11; 342/357.14
[58] Field of Search ................................... 701/300, 301, 701/302, 200, 208, 211, 213, 220, 4, 9; 342/46, 118, 123, 357.11, 357.13, 357.14, 26, 63, 65, 120, 194; 340/963, 970; 73/178 T; 244/180

[56] References Cited

U.S. PATENT DOCUMENTS

| | | | |
|---|---|---|---|
| 5,654,890 | 8/1997 | Nicoia et al. | 701/16 |
| 5,657,025 | 8/1997 | Ebner et al. | 701/300 |
| 5,757,316 | 5/1998 | Buchler | 342/357.11 |

*Primary Examiner*—William A. Cuchlinski, Jr.
*Assistant Examiner*—Yonel Beaulieu
*Attorney, Agent, or Firm*—Raymond Y. Chan; David and Raymond

[57] ABSTRACT

A positioning and ground proximity warning method for vehicle includes the steps of outputting global positioning system signals to an integrated positioning/ground proximity warning system processor; outputting an inertial navigation solution to an integrated positioning/ground proximity warning processor; measuring air pressure, and computing barometric measurements which is output to the integrated positioning/ground proximity warning processor; measuring time delay between transmission and reception a radio signal from a terrain surface, and computing radio altitude measurement which is output to the integrated positioning/ ground proximity warning processor; accessing a terrain database for obtaining current vehicle position and surrounding terrain height data which is output to the integrated positioning/ground proximity warning processor; and receiving the position, velocity and time information or said pseudorange and delta range measurements of said global positioning system, the inertial navigation solution, the radio altitude measurement, the radio altitude measurement, and the current vehicle position and surrounding terrain height data, and computing optimal positioning solution data and optimal ground proximity warning solution data.

41 Claims, 9 Drawing Sheets

POSITIONING AND GROUND PROXIMITY WARNING METHOD AND SYSTEM THEREOF FOR VEHICLE

CROSS REFERENCE OF RELATED APPLICATION

This is a regular application of a provisional application, application Ser. No. 60/108,667, filed Nov. 16, 1998.

FIELD OF THE PRESENT INVENTION

The present invention relates to an integrated positioning/ground proximity warning method and system thereof for vehicle, in which the information from the sensors of the positioning system and the ground proximity warning system are integrated to obtain improved performance and keep avionics affordable. Furthermore, the present invention can be used for aircraft with no compatible source of aircraft position.

BACKGROUND OF THE PRESENT INVENTION

Commercial low cost vehicle positioning and tracking systems represent large potential applications and markets. Commercial vehicle tracking is just one of the many applications of these systems. A commercial vehicle refers here to public service vehicles, such as those used by ambulance, fire, police, and transit departments, as well as to all classes of vehicles used in business and government service. An intelligent vehicle highway system is another application field. Intelligent vehicle highway systems apply computer, positioning, communications, and control technologies to integrate vehicles and highways in a coherent information network that facilitates the travel of individual vehicles, while optimizing traffic flow and increasing traffic capacity throughout the entire road system.

During the late 1980's, major efforts commenced through the entire world to develop and apply intelligent vehicle highway systems to reduce congestion, improve mobility and road transportation efficiency, enhance safety, conserve energy, and protect the environment. Although the taxonomy of intelligent vehicle highway systems is not yet fully consistent worldwide, the following six categories encompass virtually all elements of intelligent vehicle highway systems developed across the globe.

Advanced traffic management systems extend real-time computer optimization of traffic signal timing to the urban road network level as opposed to individual intersections or streets. This requires information on traffic conditions throughout the network in a real-time database that may also serve as an information source for dynamic route guidance in advanced traveler information systems-equipped vehicles.

Advanced traveler information systems keep drivers being informed of their location and provide route guidance to these selected destinations along with information on services such as lodging, food, fuel, repair, medical facilities, etc. The advanced traveler information systems permit communication between in-vehicle equipment and advanced traveler information systems for data on traffic conditions, diversion routes, alternative modes of transportation, etc. Although advanced traveler information system concepts originally centered on vehicular navigation and route guidance for drivers, new concepts of advanced traveler information systems include portable versions for use by pedestrians and multimodal travelers also.

Commercial vehicle operations include vehicle tracking and fleet management systems for commercial and emergency vehicles to improve operational efficiency and increase safety. They also include technologies such as automatic vehicle classification, weigh-in-motion, and communications among automated regulatory checkpoints so that intercity trucks may travel among different jurisdictions with minimal stopping.

Advanced Vehicle Control Systems apply additional technologies to vehicles to detect obstacles and adjacent vehicles, thus enhancing vehicle control by augmenting driver performance. Advanced vehicle control systems assist in the prevention of collisions for safer high-speed driving to increase roadway capacity, and they will eventually interact with fully developed advanced traffic management systems to enable automatic vehicle operation.

In addition to applying the above mentioned intelligent vehicle highway system technologies to public transportation systems, Advanced Public Transportation Systems have a strong focus on customer interface. Examples include onboard displays (e.g., for next stop, transfer information, etc.), real-time displays at bus stops, and smart card fare systems as well as ride share and high-occupancy vehicle information systems.

Advanced Rural Transportation Systems focus on issues and problems involving the development and application of intelligent vehicle highway systems to rural transportation. The major thrusts of Advanced Rural Transportation Systems include emergency communications and safety applications of intelligent vehicle highway system technologies.

Intelligent vehicle highway systems are still in the early stages of development, and, although numerous operational field trails are underway, relatively few actual applications of intelligent vehicle highway system technologies have been implemented.

Nowadays, there exist stand-alone operating positioning systems and ground proximity warning systems in civil aircraft. A positioning system is used to provide position, velocity, attitude, attitude rate information, and etc., for an aircraft flight control and management system. A ground proximity warning system is used to provide warning messages to prevent aircraft from inadvertently contacting with the ground or water.

Traditionally, positioning equipment in a civil aircraft generally employs an inertial navigation system and some radio navigation systems, such as a long range navigation system, a very-high-frequency omnidirectional range system, distance measurement equipment, tactical air navigation, and the newest global positioning system. Recently, integrated global positioning systems/inertial navigation systems have been the predominant navigation system in civil and military aircraft, replacing traditional navigation systems.

Generally speaking, an inertial navigation system comprises an onboard inertial measurement unit, a processor, and embedded software. The positioning solution is obtained by numerically solving Newton's equations of motion using measurements of vehicle specific forces and rotation rates obtained from onboard inertial sensors. The onboard inertial sensors consist of accelerometers and gyros, which, together with the associated hardware and electronics, comprise the inertial measurement unit.

The inertial navigation system may be mechanized in either a gimbaled or strapdown configuration. In a gimbaled inertial navigation system, the accelerometers and gyros are mounted on a gimbaled platform to isolate the sensors from the rotations of the vehicle, and to keep the measurements and navigation calculations in a stabilized navigation coordinated frame. Some possible navigation frames include earth centered inertial, earth centered earth fixed, locally level, with axes in the directions of north, east, down (of course, there is east, north, zenith or north, west, zenith, and locally level with a wander azimuth). In a strapdown inertial navigation system, the inertial sensors are rigidly mounted to the vehicle body frame, and a coordinate frame transformation matrix (analyzing platform) is used to transform the body-expressed acceleration to a navigation frame to perform the navigation computations in the stabilized navigation frame. Gimbaled inertial navigation systems can be more accurate and easier to calibrate than strapdown inertial navigation systems. Strapdown inertial navigation systems can be subjected to higher dynamic conditions (such as high turn rate maneuvers) which can stress inertial sensor performance. However, with the availability of newer gyros and accelerometers, strapdown inertial navigation systems are becoming the predominant mechanization, due to their low cost and reliability.

In principle, inertial navigation systems permit pure autonomous operation and output continuous position, velocity, and attitude vehicle data after initializing the starting position and initiating an alignment procedure. In addition to autonomous operation, other advantages of an inertial navigation system include the full navigation solution and wide bandwidth. However, an inertial navigation system is expensive and subjected to drift over an extended period of time. This error propagation characteristic is primarily caused by its inertial sensor error sources, such as gyro drift, accelerometer bias, and scale factor errors.

Generally, the accuracy of inertial navigation systems can be improved by employing highly accurate inertial sensors or by compensating with data from an external sensor.

The cost of developing and manufacturing inertial sensors increases as the level of accuracy improves. The advances in new inertial sensor technologies and electronic technologies have led to the availability of low cost inertial sensors, such as mechnical-electronis-micro-system inertial sensors. Mechnical-electronic-micro-system inertial sensors borrow processes from the semiconductor industry to fabricate tiny sensors and actuators on silicon chips. The precision of these new inertial sensors may be less than what conventional sensors achieve, but they have enormous cost, size, weight, thermal stability and wide dynamic range advantages over conventional inertial sensors.

The most obvious choice for implementing low cost, highly accurate, continuous positioning of a vehicle is to employ a low cost strapdown inertial system with the compensating of an external sensor. The global positioning system receiver is an ideal external sensor for an inertial navigation system.

The global positioning system is a space-based, worldwide, all-weather passive radio positioning and timing system which was developed and implemented over the course of the past two decades. The system was originally designed to provide precise position, velocity, and timing information on a global common grid system to an unlimited number of adequately equipped air, land, sea, and even space authorized users and civil users.

The global positioning system has three major operational segments:

Space Segment: The Space segment consists of a constellation of satellites (21 navigation satellites plus 3 active spares) in semi-synchronous orbit around the earth.

Control Segment: The control segment consists of one master ground control station and several other monitor stations with tracking antennas at accurately known positions throughout the earth.

User Segment: The User Segment is composed of the various kinds of end user with global positioning system receiving equipment.

The global positioning system user equipment comprises an antenna, a receiver, and associated electronics and displays, and receives signals from the global position system satellites to obtain a position, velocity, and time solution.

The global positioning system can provide Precise Positioning Service to authorized users, which is nominally within 15 meters Spherical Error Probable accuracy, and can provide Standard Position Service to civil users, which is limited to within roughly 100 meters (95% probability) by a number of error sources including ionospheric and troposheric effects and intentional degradation of the global positioning system signal, known as selective availability.

The global positioning system principle of operation is based on range triangulation. If the satellite position is known accurately via ephemeris data, the user can receive the satellite's transmitted signal and determine the signal propagation time. Since the signal travels at the speed of light, the user can calculate the measured range to the satellite. The actual range measurement (called the "pseudo range") contains errors because of a bias in the user's clock relative to the global positioning system reference time. Because atomic clocks are utilized in the satellites, their errors are much smaller in magnitude than the users' clocks. Thus, for three-dimensional position determination, and also to calculate the clock bias, a minimum of four satellites is needed to obtain a solution to the navigation problem. The velocity can be obtained by various methods, which basically amount to time differencing the pseudo ranges over the measurement time interval.

As with any other measurement system, a global positioning system contains a number of error sources, such as the signal propagation errors and satellite errors, including selective availability. The user range error is the resultant ranging error along the line-of-sight between the user and the global positioning system satellite. Global positioning system errors tend to be relatively constant (on average) over time, thus giving global positioning systems long-term error stability. However, the signals of the global positioning system may be intentionally or unintentionally jammed or spoofed, or the global positioning system receiver antenna may be obscured during vehicle attitude maneuvering, and the global positioning system signals are lost when the signal-to-noise ratio is low, and the vehicle is undergoing highly dynamic maneuvers.

The inherent drawbacks of a stand-alone inertial navigation system and a standalone global positioning system receiver show that a stand-alone inertial navigation system or a stand-alone global positioning system receiver can not meet mission requirements under certain constraints, such as low cost, long-term high accuracy, continuous output, high degree of resistance to jamming, and high dynamics.

In the case of integration of a global positioning system with an inertial navigation system, the short term accuracy of the inertial navigation system and the long term stability and accuracy of the global positioning system directly compliment each other. The global positioning system is fairly accurate but available at a slower data rate. The inertial navigation system data has low noise and is available at high data rates, but it is subjected to biases and drift that cause the errors to grow with time. The performance characteristics of the mutually compensating stand-alone global positioning system receiver and the stand-alone inertial system suggest that, in many applications, an integrated global positioning system/inertial navigation system, combining the best properties of both fields, will provide optimal continuous navigation capability. This navigation capability is unattainable in either one of the two systems alone.

The potential advantages offered by an integration of a global positioning system receiver with an inertial navigation system are outlined as follow:

(1) The integration smoothes out the random component in global positioning system observation errors, and can compensate the navigation parameter errors and inertial sensor errors of the inertial navigation system while the global positioning system signal is available, so that the inertial navigation system can provide more accurate position and attitude information during an extended period of time after the global positioning system signals are lost.

(2) The aiding of the signal tracking loop process of the global positioning system receiver with inertial data. This allows the effective bandwidth of the loops to be reduced, resulting in an improved tracking signal in a noisy environment while not sacrificing global positioning system signal dynamic tracking performance.

There are usual signal tracking loop bandwidth versus dynamic performance tradeoffs commonly encountered in signal tracking loop design of a global positioning system receiver, wherein noise effects increase with increasing loop bandwidth, while dynamic tracking errors increase with decreasing loop bandwidth. The integrated global positioning/inertial navigation system can mitigate the conflicting signal tracking loop bandwidth requirements, because the global positioning system signal acquisition and tracking processes are aided by inertial navigation data.

(3) An inertial navigation system can, not only provide navigation information when the global positioning system signals are lost temporarily, but also reduce the search time required to reacquire the global positioning system signal.

(4) The global positioning system enables and provides on-the-fly alignment of an inertial navigation system by the means of maneuvering, eliminating the static self-alignment pre-mission requirements, and improving the reaction of the inertial navigation system.

However, there are still some drawbacks in conventional integrated global positioning/inertial navigation systems as follows:

(1) Poor vertical measurement accuracy, which can not meet the requirement for precise terminal approach, landing, and collision avoidance in heavy traffic airspace.

(2) Insufficient reliability. When a low cost, low accuracy inertial navigation system is employed to integrate with a global positioning system receiver, long-term navigation accuracy is mostly dependent on the global positioning system. If global positioning system signals are lost for a short period of time, or if the malfunction of a global positioning system satellite occurs, the navigation accuracy diverges very fast.

Therefore, there is an urgent need to overcome these drawbacks to enhance aviation safety.

As aviation markets are extended, there are more and more emphases on aviation safety. Usually, one aircraft accident classification scheme includes:

(1) Controlled Flight Into Terrain
(2) Loss of Control (caused by an aircraft malfunction)
(3) Loss of control (caused by crew error)
(4) Airframe structure or system failure
(5) Mid-air collision
(6) Ice/Snow
(7) Fuel exhaustion
(8) Loss of control (other)
(9) Runway Incursion Since the beginning of powered flight, Controlled Flight Into Terrain-type airplane accidents have been a worldwide problem and an important accident classification. In these airplane crash accidents, a properly functioning airplane under the control of a fully qualified and certified crew, often in clouds or darkness, is flown into terrain or water or obstacles with no apparent awareness on the part of the crew. There is no airframe icing, no wind shear, no collision with other aircraft, and no loss of control. The Controlled Flight Into Terrain has received a number of studies and considerable attention since the early 1970's.

Since the Federal Aviation Administration mandated an independent Ground Proximity Warning System in 1974 for commercial turbojet/turboprop aircraft with more than 10 passenger seats which fly in U.S. airspace, traditional ground proximity warning systems have dramatically reduced the number of Controlled Flight Into Terrain accidents among airlines, by monitoring the aircraft's height above ground as determined by a radio altimeter. There have been one to two aircraft Controlled Flight Into Terrain accidents a year in average since 1985. Before the mandate, it varied from seven to eighteen years.

The ground proximity warning system computer keeps track of the radio altimeter readings and other flight information and provides audible, visual, and meaningful warnings to aircrew when the aircraft flight status meets any of the following (1) Excessive descent rates while too close to the ground.
(2) Excessive terrain closure rates (aircraft is descending too quickly or is flying toward higher terrain).
(3) Excessive descent rates after takeoff.
(4) Inadvertent descent after takeoff
(5) Insufficient terrain clearance.
(6) Flight into terrain at low altitude and not in approach and landing configuration.

Although traditional ground proximity warning systems have saved thousands of lives, it still fails to prevent all Controlled Flight Into Terrain accidents. Traditional ground proximity warning systems can not really tell what is ahead of the airplane. It can only look down, as the radio altimeter measures the distance from the airplane to the ground. The ground proximity warning system is designed to predict if a potential terrain problem lies ahead by tracking information from the recent past and projecting any trend into the future. This can warn a pilot when the airplane is flying towards terrain that slops upward, but it can not warn in time to avoid, for example, a sheer cliff or extremely steep slope. In addition, ground proximity warning systems have to be "desensitized" under certain conditions to prevent nuisance warnings. For instance, when wing flaps and landing gear are extended, the system is desensitized to prevent an unnecessary warning while the pilot intentionally flies the airplane toward the ground for landing.

The available improved ground proximity warning system, which is called the Enhanced Ground Proximity Warning System, is the result of an effort to further reduce the Controlled Flight Into Terrain risk. The enhanced ground proximity warning system uses a worldwide digital terrain database. Also, the enhanced ground proximity warning system adds two enhancements to the traditional ground proximity warning system:

(1) It can provide the flight crew a map-like display of nearby terrain.

(2) It sounds an audible alert approximately one minute's flight time or more away from terrain. Traditional ground proximity warning systems typically sound a warning from a few seconds to about 30 seconds from terrain, but average 10 to 15 seconds.

The enhanced ground proximity warning system computer uses information provided by the onboard navigation system and terrain database. The enhanced ground proximity warning system computer uses aircraft position, performance, and configuration data to calculate an envelope along the projected flight path of the aircraft and compares that to the terrain database.

Since the enhanced ground proximity warning system display can show nearby terrain, pilots are much less likely to continue flying toward that terrain.

In current developing degree of the positioning systems and the ground proximity warning systems, the positioning system and the ground proximity warning system are two separated independent systems, wherein another external positioning system is required to support the ground proximity warning system.

As above mentioned, conventional integrated global positioning/inertial navigation systems integrates the information from an inertial measurement unit and a global positioning system receiver to obtain improved navigation solution. Conventional ground proximity warning systems use the position information provided by the conventional integrated global positioning/inertial navigation systems or stand-alone global positioning systems or stand-alone inertial navigation system and the information from a radio altimeter and a baro altimeter and a terrain database to solve ground proximity warning problem. The process for both conventional integrated global positioning/inertial navigation systems and conventional ground proximity warning systems is implemented in software in microprocessors. As advances in speed and memory of microprocessors, it is possible to implement an integrated positioning and ground proximity warning system. Furthermore, an integrated process for position solution and ground proximity warning solution can provide better performance than an independent positioning system and an independent ground proximity warning system, because the information from the radio altimeter, the baro altimeter, and the terrain database which are employed by conventional ground proximity warning systems has potential capability for improving the accuracy and reliability of conventional positioning systems, and improved position information in turn improve the performance of conventional ground proximity warning systems.

SUMMARY OF THE PRESENT INVENTION

Accordingly, compared to existing, separate processes and systems for positioning and ground proximity warning systems, it is a main objective of the present invention to provide an integrated method and system for positioning and preventing Controlled Flight Into Terrain flight accidents for aircraft to obtain improved performances, such as navigation accuracy, high degree of tolerance to loss of a global positioning system signal, global positioning system integrity monitoring, precise and reliable ground proximity warning information, and to make air travel safer in increasingly busy skies, as follows:

(1) The performance of an integrated positioning system and the ground proximity warning system is unattainable in the two systems alone.

(2) The positioning accuracy of the present invention is higher than the conventional integrated global positioning system /inertial navigation system alone.

(3) The system of the present invention has ability to detect the malfunction of the global positioning system satellite.

(4) Prompt and accurate ground proximity warning message is available, due to more accurate positioning solution provided by the system of the present invention.

(5) The system of the present invention reduces false ground proximity warning probability, due to a more accurate positioning solution provided by the system of the present invention.

(6) Compared with the conventional enhanced ground proximity warning systems, in the system of the present invention, an external navigation system is not required to support the ground proximity warning solution. This is especially affordable for small commercial aircraft vehicle.

Another objective of the present invention is to provide an integrated positioning/ground proximity warning method and system thereof, in which the information from the sensors of the positioning system and the ground proximity warning system are integrated to obtain improved performance and keep avionics affordable, in comparison with the conventional independent-solution positioning system and the ground proximity warning system. Furthermore, the present invention can be used for vehicle with no compatible source of vehicle position.

Another objective of the present invention is to provide an integrated positioning/ground proximity warning method and system thereof, in which the information from a terrain database and inertial navigation system are processed to update the horizontal position of the inertial navigation system to improve the horizontal position accuracy when global positioning system signals are lost.

Another objective of the present invention is to provide an integrated positioning/ground proximity warning method and system thereof, in which the altitude measurement from the radio altimeter and inertial navigation system and the information from the terrain database are processed to update the altitude solution of the inertial navigation system to improve the vertical navigation accuracy to meet the requirement for precise terminal approach and landing, and collision avoidance in heavy traffic airspace.

Another objective of the present invention is to provide an integrated positioning and ground proximity warning method and system thereof, in which the measurements from a global positioning system and an inertial navigation system are processed to update the solution of the inertial navigation system.

Another objective of the present invention is to provide an integrated positioning and ground proximity warning method and system thereof, in which the measurement from an inertial navigation system and a radio altimeter and the information from a terrain database are processed to perform global positioning system integrity monitoring.

Another objective of the present invention is to provide an integrated positioning and ground proximity warning method and system thereof, in which the improved navigation solution is fed back to the global positioning system receiver to aid the tracking processing of the global positioning system signal to improve the resistance capability to jamming and high dynamic.

Another objective of the present invention is to provide an integrated positioning and ground proximity warning method and system thereof, in which the improved navigation solution is fed back to the global positioning system receiver to aid the acquisition and re-acquisition processing of the global positioning system signal to reduce acquisition for global positioning system first fix and re-acquisition time after the global positioning system signals are lost.

Another objective of the present invention is to provide an integrated positioning and ground proximity warning method and system thereof, in which the improved navigation solution can be used to obtain a ground proximity warning message on time.

Another objective of the present invention is to provide an integrated positioning and ground proximity warning method and system thereof, in which the improved navigation solution can be used to obtain a more precise ground proximity warning message.

Another objective of the present invention is to provide an integrated positioning and ground proximity warning method and system thereof, in which a synthetic vision system can be used to display the ground proximity warning solution and provide an extended vision field for surrounding terrain situation awareness.

Another objective of the present invention is to provide an integrated positioning and ground proximity warning method and system thereof, in which a voice device is equipped to provide the audible warning message to flight crew.

DETAILED DESCRIPTION OF THE PREFERRED EMBODIMENT

The present invention provides a positioning and ground proximity warning method and system thereof, which are integrated method and system for positioning and ground proximity warning for a vehicle in air, such as an aircraft, which uses information from a global positioning system, an inertial navigation system, a baro altimeter, a radio altimeter, a terrain database, and a flight control and management system.

Figure 1:
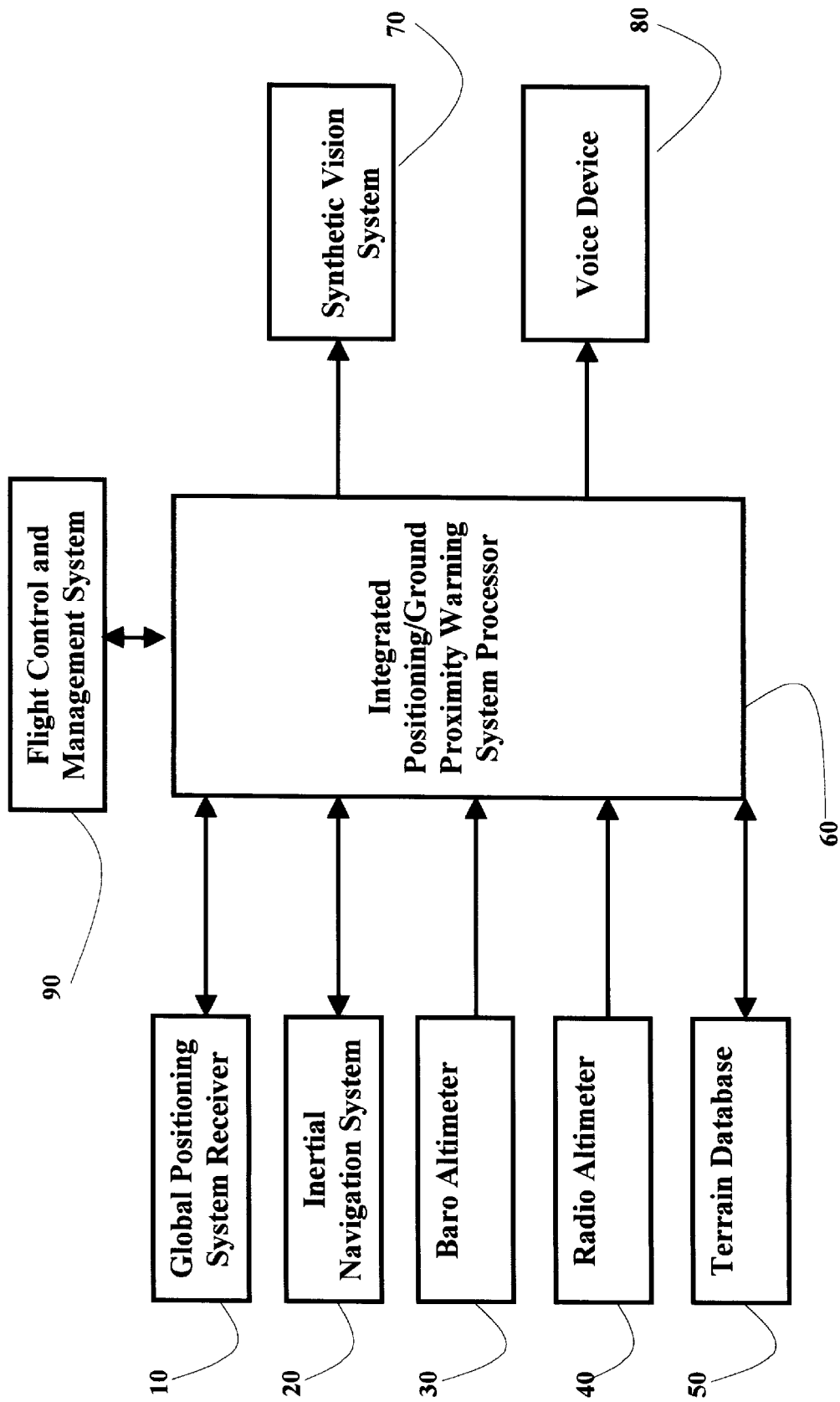
FIG. 1 is a block diagram illustrating an integrated positioning and ground proximity warning method and system.

Referring to FIG. 1, the integrated positioning and ground proximity warning system comprises a global positioning system receiver 10, an inertial navigation system 20, a baro altimeter 30, a radio altimeter 40, a terrain database 50, and a positioning/ground proximity warning system processor 60.

The global positioning system receiver 10 receives global positioning system signals and deriving position, velocity and time information or pseudorange and delta range measurements of the global positioning system.

The inertial navigation system 20 solves navigation equations with angular rate and specific force information from an inertial measurement unit and obtaining an inertial navigation solution.

The baro altimeter 30 provides baro altitude measurements. The radio altimeter 40 provides radio altitude measurement from the terrain surface. The terrain database 50 provides global terrain data and obtains the terrain height of the current vehicle position and surrounding terrain height data.

The positioning/ground proximity warning system processor 60 receives data from the global positioning system receiver 10, the inertial navigation system 20, the baro altimeter 30, the radio altimeter 40, and the terrain database 50. The positioning/ground proximity warning system processor 60 also receives vehicle performance and configuration data from an onboard flight control and management system 90 and providing optimal position, velocity, attitude navigation information, and an optimal ground proximity warning information.

The global positioning system receiver 10 is connected with the integrated positioning/ground proximity warning processor 60. The inertial navigation system 20 is connected with the integrated positioning/ground proximity warning processor 60. The baro altimeter 30 is connected with the integrated positioning/ground proximity warning processor 60. The radio altimeter 40 is connected with the integrated positioning/ground proximity warning processor 60. The terrain database 50 is connected with the integrated positioning/ground proximity warning processor 60.

A synthetic vision system 70 can be connected with the positioning/ground proximity warning system processor 60 to provide the flight crew with an enhanced vision field display for the ground proximity warning.

A voice device 80 can be connected with the positioning/ground proximity warning system processor 60 to provide the flight crew with audible ground proximity warning messages.

The global position system receiver 10 may be selected as a differential global position system receiver or as a multi-antenna global position system receiver or as a global position system receiver with wide area augmentation.

The terrain database 50 may be selected as:

An onboard terrain database.

A ground-based terrain database, which is accessed through a data link by the integrated positioning and ground proximity warning system.

Referring to FIG. 1, the connection between the global position system 10, the inertial navigation system 20, the baro altimeter 30, the radio altimeter 40, the terrain database 50, the integrated positioning/ground proximity warning system processor 60, the synthetic vision system 70, the voice device 80, and the onboard flight control and management system 90 can be one of the following means:

(1) Bus-based structure, such as inter bus, MIL-1553, ARIC 429.

(2) Communication port-based structure, including synchronous communication interface and synchronous communication interface, such as RS-232, RS*422*, RS-485, etc.

(3) Network-based structure, such as NE2000.

Figure 8:
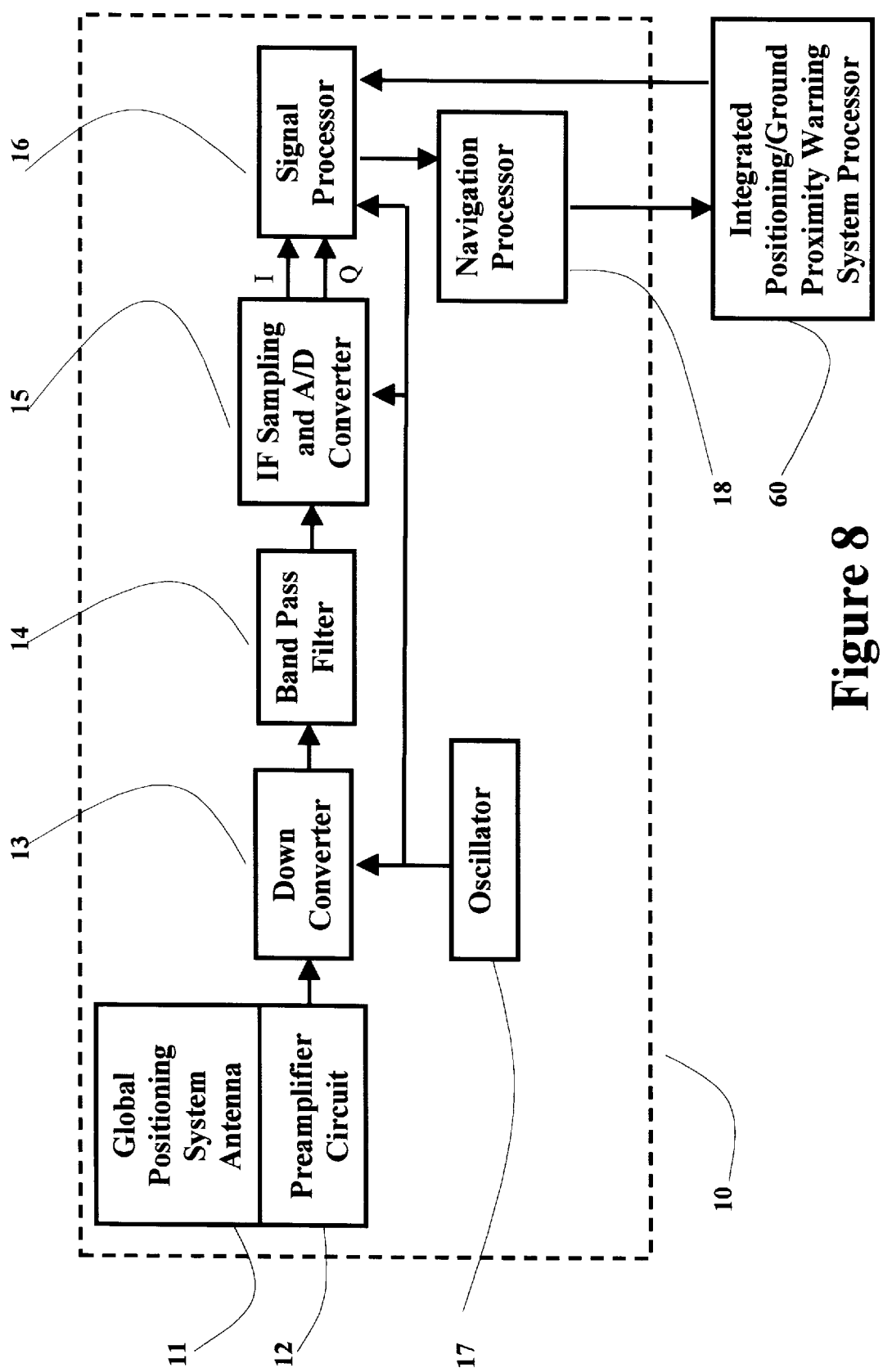
FIG. 8 is a block diagram illustrating the global positioning system receiver 10.

Referring to FIG. 1 and FIG. 8, the global positioning system receiver 10, which is connected with the integrated positioning/ground proximity warning processor 60, comprises a navigation processor 18 adapted for providing the following two types of data to the integrated positioning/ground proximity warning system processor 60:

1) Vehicle position, velocity, and time information.
2) Global positioning system receiver's raw measurements: pseudorange, delta range measurements, and satellite ephemeris of the global positioning system.

A signal processor 16 receives the optimal vehicle position, velocity, acceleration, and attitude solution data from the integrated positioning/ground proximity warning system processor 60 to aid the signal tracking, acquisition, and reacquisition processing of the global positioning system.

The global positioning system receiver 10 further comprises a global positioning system antenna 11, which is connected with a preamplifier circuit 12. The global positioning system antenna 11 receives radio frequency (RF) signal of the global positioning system and outputs the received RF signals to the preamplifier circuit 12.

The preamplifier circuit 12 is connected between the global positioning system antenna 11 and a down converter 13, and amplifies the input RF signal of the global positioning system to improve the signal-noise ratio, and outputs the amplified RF signal of the global positioning system to the down converter 13.

The down converter 13 is connected between the preamplifier 12 and a band pass filter 14, and converts down the input RF signal of the global positioning system to the intermediate frequency (IF) signal, and outputs the IF signal to the band pass filter 14.

The band pass filter 14 is connected between the down converter 13 and an IF sampling and A/D converter 15 and filters out the noise of the input IF signal to improve the signal-noise ratio, and sends the filtered IF signal to the IF sampling and A/D convert 15.

The IF sampling and A/D converter 15 is connected between the band pass filter 14 and a signal processor 16, and sample the input IF signal, which is an analog signal. The IF sampling and A/D converter 15 outputs the digital in-phase (I) and quadraphase (Q) to the signal processor 16.

The signal processor 16 is connected between the IF sampling and A/D converter 15 and a navigation processor 18. The signal processor 16 receives a digital in-phase (I) and quadraphase (Q) from the IF sampling and A/D converter 15 and receives the optimal vehicle position, velocity, acceleration, and attitude solution data from the integrated positioning/ground proximity warning system processor 60, and performs the signal acquisition, tracking, and reacquisition processing which is aided by the data from the integrated positioning/ground proximity warning system processor 60, and outputs the pseudorange, delta range, and satellite ephemeris of the global positioning system to the navigation processor 18.

The navigation processor 18 is connected with the signal processor 16, and solves navigation solution using the input pseudorange, delta range, and satellite ephemeris of the global positioning system from the signal processor 16, and provides the following two types of data to the integrated positioning/ground proximity warning system processor 60:

1) The vehicle position, velocity, and time information.
2) The global positioning system receiver's raw measurements: pseudorange, delta range measurements, and satellite ephemeris of the global positioning system.

An oscillator 17 is connected with the down converter 13, the IF sampling and A/D converter 15, and the signal processor 16 to provide the local reference signals.

Figure 9:
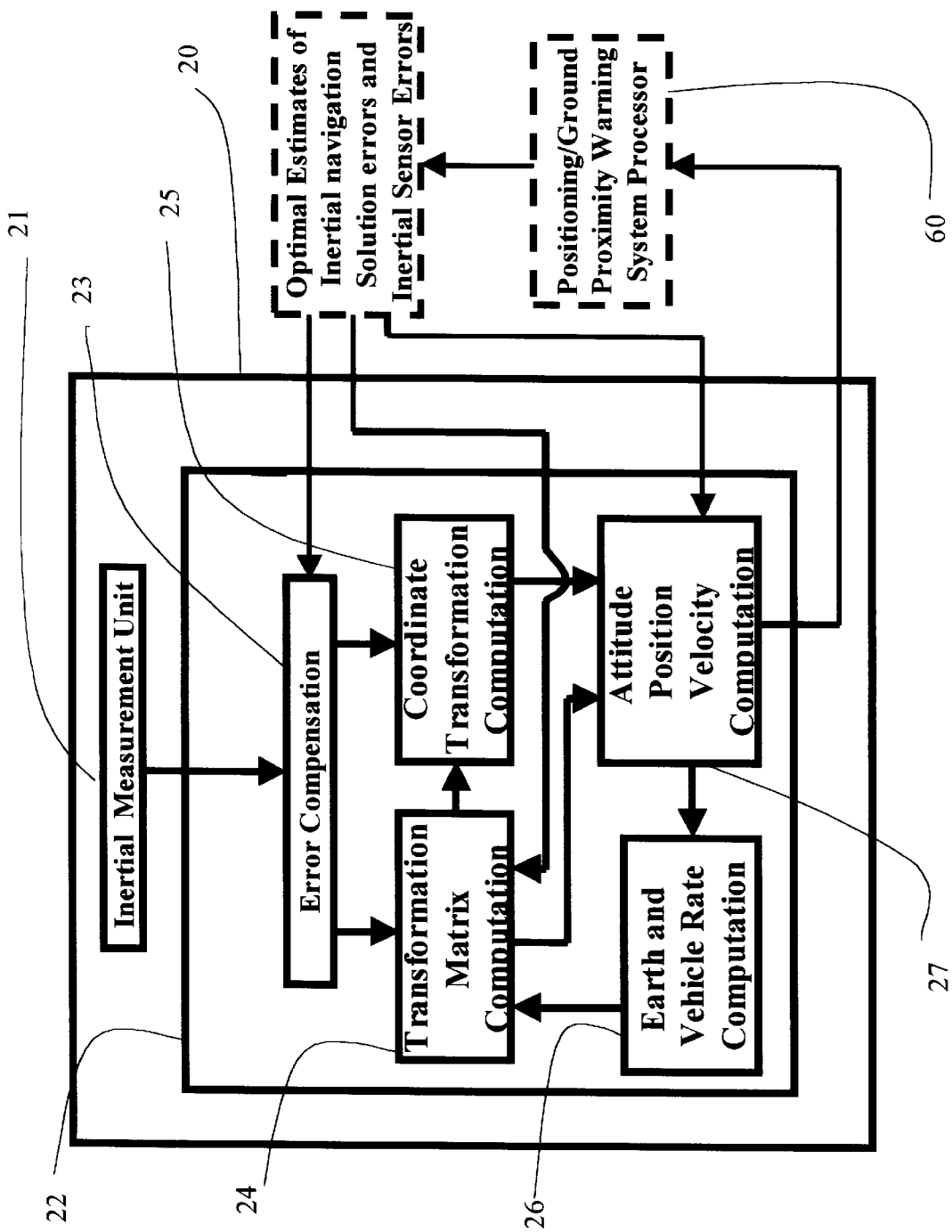
FIG. 9 is a block diagram illustrating the inertial navigation system 20.

Referring to FIG. 1 and FIG. 9, the inertial navigation system 20, which is connected with the integrated positioning/ground proximity warning system processor 60, and receives an optimal estimates of inertial navigation solution errors and inertial sensor errors from the integrated positioning/ground proximity warning system processor 60, and outputs the inertial navigation solution, such as position, velocity and attitude to the integrated positioning/ground proximity warning system processor 60.

The inertial navigation system 20 further comprises an inertial measurement unit 21 and an inertial navigation processor 22. The inertial measurement unit 21 is connected with the inertial navigation processor 22 to provide measured body angular rates and specific force.

The inertial navigation processor 22 comprises the following processing modules:

An error compensation 23 receives the body angular rates and specific forces from the inertial measurement unit 21, which are sensed by the gyros and accelerometers of the inertial measurement unit 21, and optimal estimates of inertial sensor errors from the integrated positioning/ground proximity warning system processor 60, and calibrates the error of the body angular rates and specific forces. The error compensation 23 outputs the compensated body angular rates to a transformation matrix computation 24, and outputs the compensated body specific forces to a coordinate transformation computation 25.

The transformation matrix computation 24 receives compensated body angular rates from the error compensation 23, and the rotation rate vector of the local navigation frame (n frame) relative to the inertial frame (i frame) from an earth and vehicle rate computation 26, and the optimal estimates of attitude errors from the integrated positioning/ground proximity warning system processor 60, and updates a transformation matrix from the body frame (b frame) to the n frame, and the removes attitude errors. The way to update the attitude matrix is by the Euler method, or the direction cosine method, or the quaternion method. The transformation matrix computation 24 outputs the transformation matrix to the coordinate transformation computation 25 and an attitude position velocity computation 27.

The coordinate transformation computation 25 receives a compensated specific force from the error compensation 23 and the transformation matrix from the transformation matrix computation 24, and transforms the specific force expressed in the body frame to the specific force expressed in the navigation frame, and outputs the specific force expressed in the navigation frame to the attitude position velocity computation 27.

The attitude position velocity computation 27 receives the specific force expressed in the navigation frame from the coordinate transformation computation 25, and the updated transformation matrix from the transformation matrix computation 24, and the optimal estimates of position errors and velocity errors from the integrated positioning/ground proximity warning system processor 60, and computes the position, velocity, and attitude, and removes the errors of the position and velocity, and outputs the inertial navigation solution to the Earth and vehicle rate computation 26 and the integrated positioning/ground proximity warning system processor 60.

The Earth and vehicle rate computation 26 receives the inertial navigation solution from the attitude position velocity computation 27, and computes a rotation rate vector of the local navigation frame (n frame) with respect to the inertial frame (i frame), and outputs the rotation rate vector of the local navigation frame (n frame) with respect to the inertial frame (i frame) to the transformation matrix computation 24.

Referring to FIG. 1, the baro altimeter 30, which is connected with the integrated positioning/ground proximity warning system processor 60, senses air pressure, and computes the baro altitude measurements, and outputs the baro altitude measurements to the integrated positioning/ground proximity warning system processor 60.

Referring to FIG. 1, the radio altimeter 40, which is connected with the integrated positioning/ground proximity warning system processor 60, transmits radio signal, and receives the echoes of the radio from the terrain surface, and measures the time delay between transmission and reception of the radio signal, and transforms the time delay to the radio altitude measurement, and outputs the radio altitude measurement to the integrated positioning/ground proximity warning system processor 60.

Referring to FIG. 1, the terrain database 50, which is connected with the integrated positioning/ground proximity warning system processor 60, receives the query parameters of the database from the integrated positioning/ground proximity warning system processor 60, and outputs the terrain height data of the current vehicle position and surrounding area to the integrated positioning/ground proximity warning system processor 60.

Figure 2:
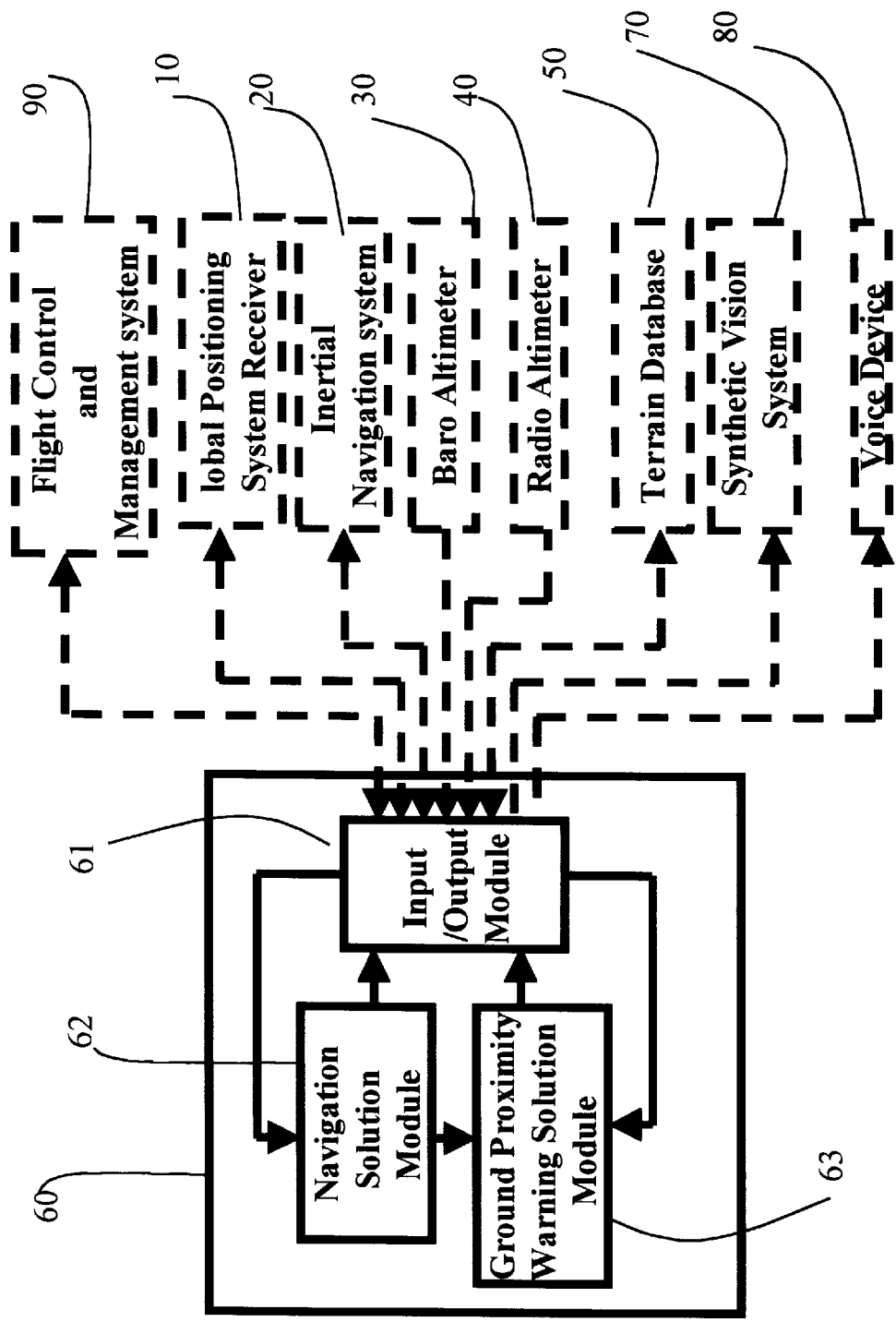
FIG. 2 is a block diagram illustrating an integrated positioning/ground proximity warning processor 60.

Referring to FIG. 2, the integrated positioning/ground proximity warning system processor 60 comprises the following modules:

An input/output module 61 manages the input and output of data from other devices and the onboard flight control and management system 90.

A navigation solution module 62 is connected with the input/output module 61 and a ground proximity warning solution module 63. The navigation solution module 62 fuses the information from all sensors of the system of the present invention to obtain an optimal navigation solution, and outputs the obtained optimal navigation solution to the onboard flight control and management system 90 and the ground proximity warning solution module 63, and outputs optimal position and velocity to the global positioning system receiver 10, and outputs optimal estimates of inertial navigation solution error and inertial sensor errors to the inertial navigation system 20.

Figure 3:
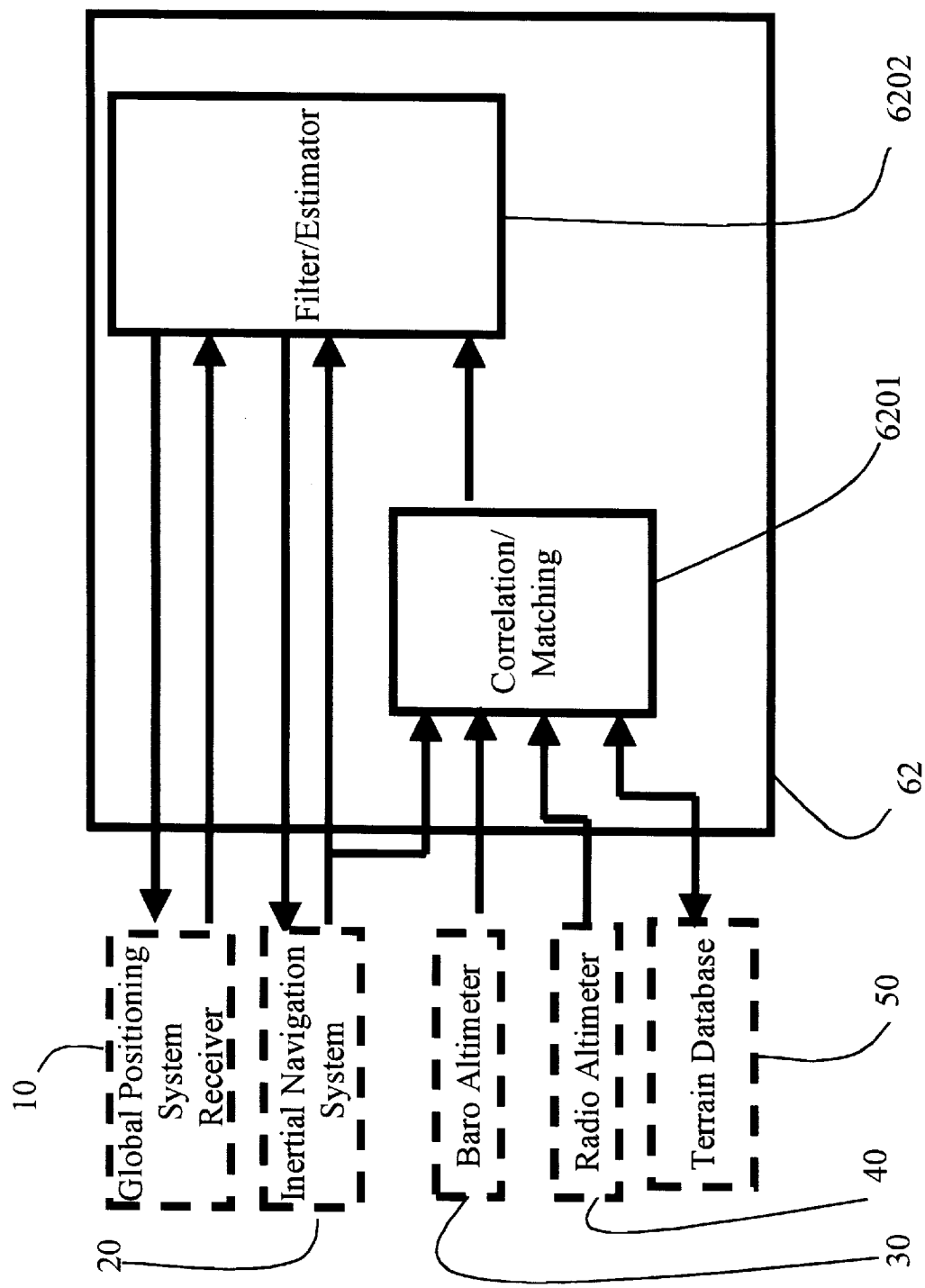
FIG. 3 is a block diagram illustrating the 6(a) realization of the navigation solution module 62.

To obtain different degrees of performance of the system of the present invention, the navigation solution module 62 may be realized in the following ways:

6(a). Referring to FIG. 3, a correlation/matching 6201 accepts individual radio altimeter measurements from the radio altimeter 40, barometric altimeter measurements from the baro altimeter 30, and terrain data from the terrain database 50 through the input/output module 61. The individual radio altimeter measurements and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6201. Once a match is found, the correlation/matching 6201 outputs the geographic coordinates of the best matching reference profile to a filter/estimator 6202.

In addition, the correlation/matching 6201 differences the result of adding radio altimeter measurements with terrain height of the current vehicle position with the inertial altitude solution (or hybrid baro/inertial altitude measurement) to form altitude measurement residues to the filter/estimator 6202.

The filter/estimator 6202 filters the measurements for the global positioning system receiver 10, the inertial navigation solution from the inertial navigation system 20, and the geographic coordinates of the best matching reference profile and altitude measurement residues from the correlation/matching 6201 to obtain optimal estimates of the inertial navigation solution errors, errors of the global position system receiver, and errors of inertial sensors in a centralized filtering fashion. The optimal positioning solution can be obtained using the following two methods:

6(a)-1. The filter/estimator 6202 compensates the inertial navigation solution from the inertial navigation system 20 with the optimal estimates of the navigation solution errors.

6(a)-2. The inertial navigation system 20 accepts the fed back optimal estimates of the inertial navigation solution errors and the inertial sensor errors to calibrate the errors.

Figure 4:
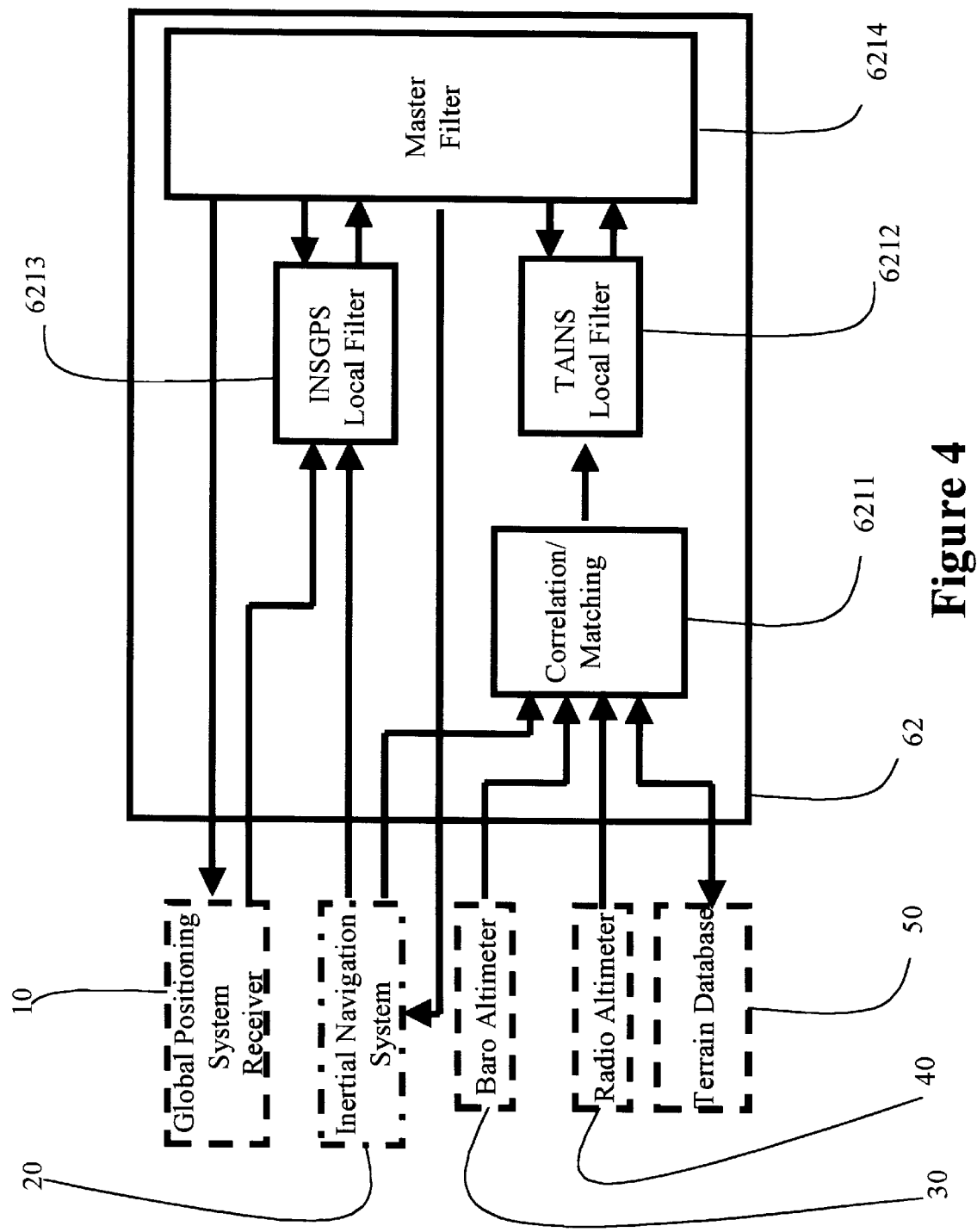
FIG. 4 is a block diagram illustrating the 6(b) realization of the navigation solution module 62.

6(b) Referring to FIG. 4, the correlation/matching 6211 accepts individual radio altimeter measurements from the radio altimeter 40, barometric altimeter measurements from the baro altimeter 30, and terrain data from the terrain database 50 through the input/output module 61. The individual radio altimeter measurements and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6211. Once a match is found, the correlation/matching 6211 outputs the geographic coordinates of the best matching reference profile to a TAINS local filter 6212.

In addition, the correlation/matching 6211 differences the result of adding radio altimeter measurements with terrain height of the current vehicle position with the inertial altitude solution (or hybrid baro/inertial altitude measurement) to form altitude measurement residues to the TAINS local filter 6212.

The TAINS local filter 6212 models the inertial navigation solution errors and inertial sensor errors, and filters the geographic coordinates of the best matching reference profile and altitude measurement residues to obtain the local optimal estimates of inertial navigation solution errors and inertial sensor errors.

An INSGPS local filter 6213 inputs the measurements from the global positioning system receiver 10 and the inertial navigation solution from the inertial navigation system 20 to obtain the local optimal estimates of inertial navigation solution errors, global position system receiver errors, and inertial sensor errors.

A master filter 6214 receives the local optimal estimates and covariance matrix of inertial navigation solution errors, errors of the global position system receiver, and errors of the inertial sensor from the INSGPS local filter 6213 and the local optimal estimates and covariance matrix of the inertial navigation solution errors and errors of the inertial sensor from the TAINS local filter 6212, and filters these data, and provides the global optimal estimates of inertial navigation solution errors, the global position system receiver errors, and the inertial sensor errors.

The INSGPS local filter 6213 and the TAINS local filter 6212 accepts the fed back global optimal estimates of inertial navigation solution errors, the global position system receiver errors, and the inertial sensor errors and the covariance matrix obtained by the master filter 6214 to reset the INSGPS local filter 6213 and the TAINS local filter 6212 and performs information-sharing among the master filter 6214, the INSGPS local filter 6213, and the TAINS local filter 6212.

To obtain different system performances, the communication and estimation between the master filter 6214, the INSGPS local filter 6213, and the TAINS local filter 6212 may have different approaches.

The master filter 6214 can also perform the consistency test among the state estimates of the master filter 6214, the INSGPS local filter 6213 and the TAINS local filter 6212, to detect and isolate the malfunction of a satellite of the global positioning system and to reconfigure the structure and process of the navigation solution module 62.

The optimal positioning solution can be obtained using the following two methods:

6(b)-1. The master filter 6214 compensates the inertial navigation solution from the inertial navigation system 20 with the optimal estimates of the navigation solution errors.

6(b)-2. The inertial navigation system 20 accepts the fed back optimal estimates of the inertial navigation solution errors and the inertial sensor errors to calibrate the errors.

Figure 5:
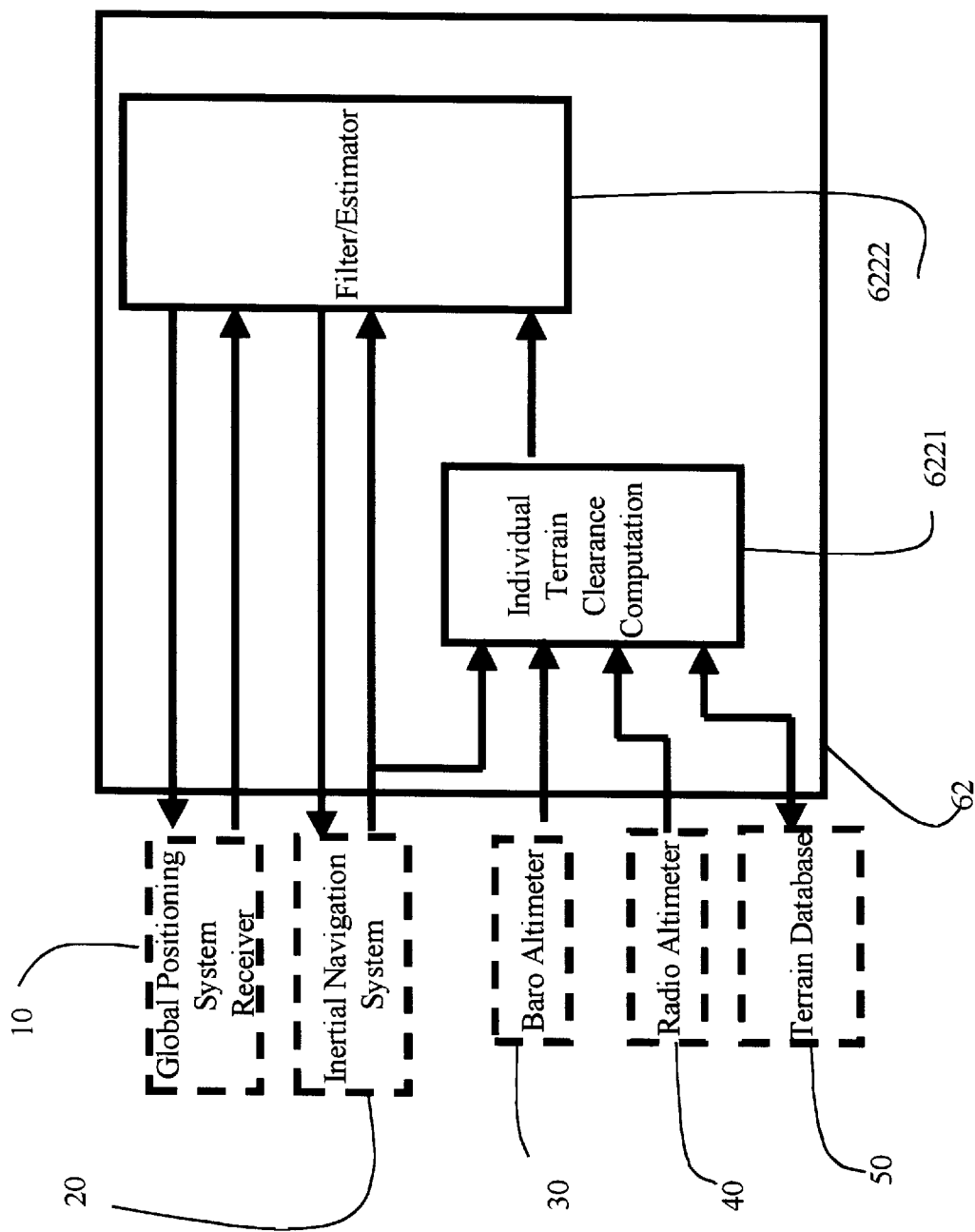
FIG. 5 is a block diagram illustrating the 6(c) realization of the navigation solution module 62.

6(c). Referring to FIG. 5, an individual terrain clearance computation 6221 accepts the inertial navigation solution from the inertial navigation system 20, the baro altitude measurement from the baro altimeter 30, the radio altitude measurement from the radio altimeter 40, and terrain data from the terrain database 50.

The individual baro altitude measurements (or hybrid baro/inertial altitude measurement) is subtracted by the height of terrain at the current position to form the referenced individual terrain-clearance measurement. The radio altitude measurement is the individual measured terrain-clearance measurement. The individual terrain clearance computation 6221 outputs the deference between the measured terrain-clearance measurement and the referenced terrain-clearance measurement to a filter/estimator 6222.

Due to the undulating nature of terrain, the terrain-clearance measurement is a nonlinear function of vehicle position. Furthermore, the difference between the measured terrain-clearance measurement and the referenced terrain-clearance measurement is a function of the inertial navigation solution errors.

The terrain clearance measurement equation is theoretically a nonlinear function of the antenna pattern of the radio altimeter 40, the cross-range/downrange position, altitude, and attitude of the vehicle. Generally, a reasonable approximation to the k th referenced terrain clearance measurement is $$TC_k = h_{INS} - h(X_k, Y_k) + v_k \quad (1)$$

where, $TC_k$ is the k th referenced terrain clearance measurement; $h_{INS}$ is the height of the vehicle indicated by the inertial navigation system 20 or hybrid baro/inertail altitude measurement; $h(X_k, Y_k)$ is the height of the terrain at the position (X,Y) indicated by the inertial navigation system 20; $v_k$ is the error of the terrain database 50.

The filter/estimator 6222 filters the measurements for the global positioning system receiver 10, the inertial navigation solution from the inertial navigation system 20, and the difference between the measured terrain-clearance measurement and referenced terrain-clearance measurement from the individual terrain clearance computation 6221 in a centralized filtering fashion to obtain optimal estimates of the inertial navigation solution errors, the global position system receiver errors, and the inertial sensor errors.

Because the $h(X_k, Y_k)$ is a nonlinear function of the position (X,Y), the filter/estimator 6222 is a nonlinear filter/estimator.

The optimal positioning solution can be obtained using the following two methods:

6(c)-1. The filter/estimator 6222 compensates the inertial navigation solution from the inertial navigation system 20 with the optimal estimates of the navigation solution errors.

6(c)-2. The inertial navigation system 20 accepts the fed back optimal estimates of the inertial navigation solution errors and the inertial sensor errors to calibrate the errors.

Figure 6:
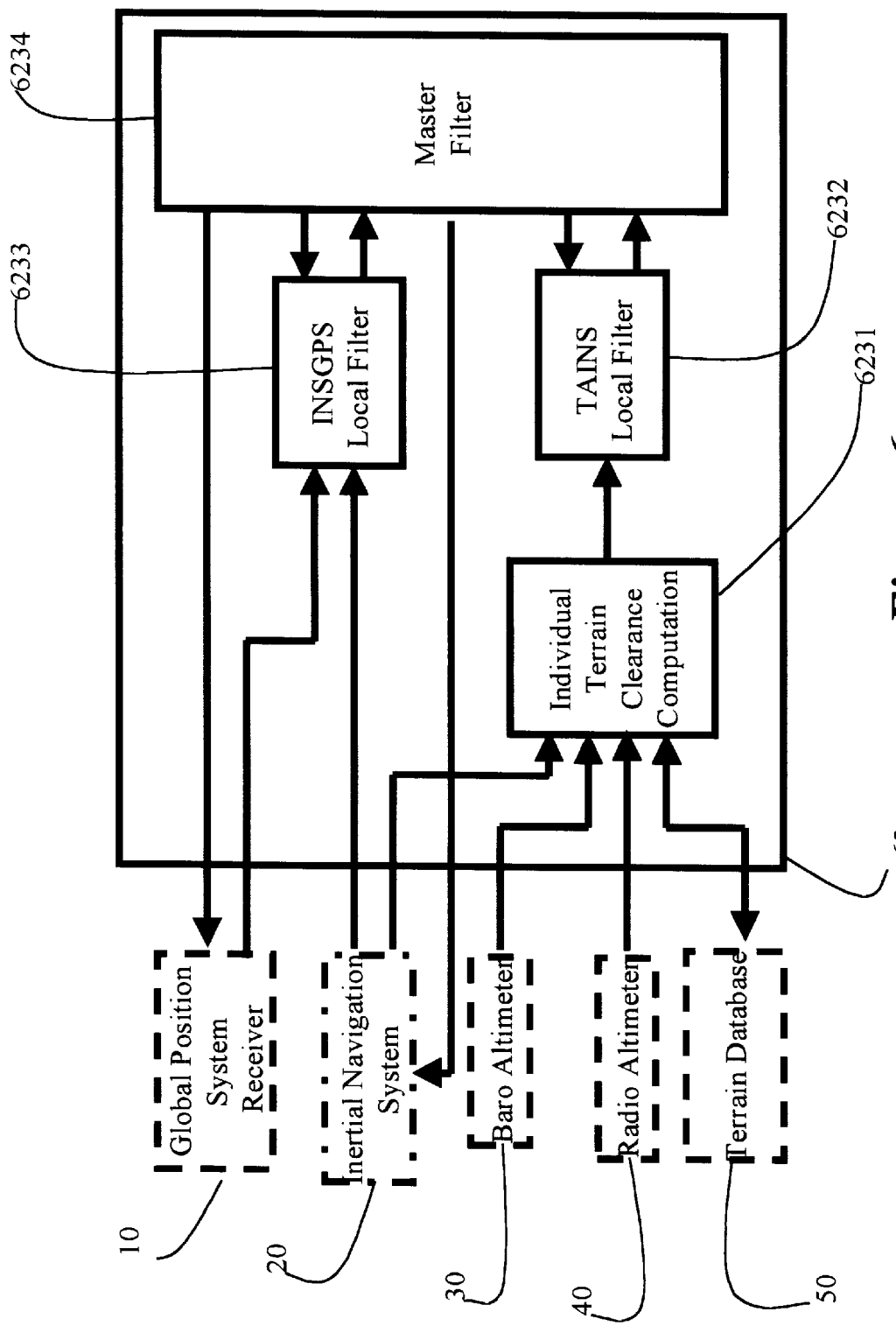
FIG. 6 is a block diagram illustrating the 6(d) realization of the navigation solution module 62.

6(d). Referring to FIG. 6, an individual terrain clearance computation 6231 accepts the inertial navigation solution from the inertial navigation system 20, the baro altitude measurement from the baro altimeter 30, the radio altitude measurement from the radio altimeter 40, and terrain data from the terrain database 50. The individual baro altitude measurements (or hybrid baro/inertail altitude measurement) is subtracted by the height of terrain at the current position to form the referenced individual terrain-clearance measurement. The radio altitude measurement is the individual measured terrain-clearance measurement. The individual terrain clearance computation 6231 outputs the difference between the measured terrain-clearance measurement and the referenced terrain-clearance measurement to a TAINS local filter 6232.

The TAINS local filter 6232 models the inertial navigation solution errors and inertial sensor errors, and filters the difference between the measured terrain-clearance measurement and the referenced terrain-clearance measurement to obtain the local optimal estimates of inertial navigation solution errors and inertial sensor errors.

Because the $h(X_k, Y_k)$ is a nonlinear function of the position (X,Y), the TAINS local filter 6232 is a nonlinear filter/estimator or extended Kalman filter.

An INSGPS local filter 6233 accepts and filters the measurements of GPS from the global positioning system receiver 10 and the inertial navigation solution from the inertial navigation system 20 to obtain the local optimal estimates of inertial navigation solution errors, the global position system receiver errors, and the inertial sensor errors.

The master filter 6234 receives the local optimal estimates and covariance matrix of the inertial navigation solution errors, the global position system receiver errors, and the inertial sensor errors from the INSGPS local filter 6233 and the local optimal estimates and covariance matrix of the inertial navigation solution errors and the inertial sensor errors from the TAINS local filter 6232 and processes these data, and provides the global optimal estimates of inertial navigation solution errors, global position system receiver errors, and inertial sensor errors.

The INSGPS local filter 6233 and the TAINS local filter 6232 accepts the fed back global optimal estimates of inertial navigation solution errors, the global position system receiver errors, and the inertial sensor errors and the covariance matrix obtained by the master filter 6234 to reset the INSGPS local filter 6233 and the TAINS local filter 6232 and performs information-sharing among the master filter 6234, the INSGPS local filter 6233, and the TAINS local filter 6232.

To obtain different system performance, the communication and estimation among the master filter 6234, the INSGPS local filter 6233, and the TAINS local filter 6232 may have different approaches.

The master filter 6234 can also perform the consistency test among the state estimates of the master filter 6234, the INSGPS local filter 6233, and the TAINS local filter 6232 to detect and isolate the malfunction of the satellite of the global positioning system and to reconfigure the structure and process of the navigation solution module.

The optimal positioning solution can be obtained by using the following two methods:

6(d)-1. The master filter 6234 compensates the inertial navigation solution from the inertial navigation system 20 with the optimal estimates of the navigation solution errors.

6(d)-2. The inertial navigation system 20 accepts the fed back optimal estimates of the inertial navigation solution errors and the inertial sensor errors to calibrate the errors.

Figure 7:
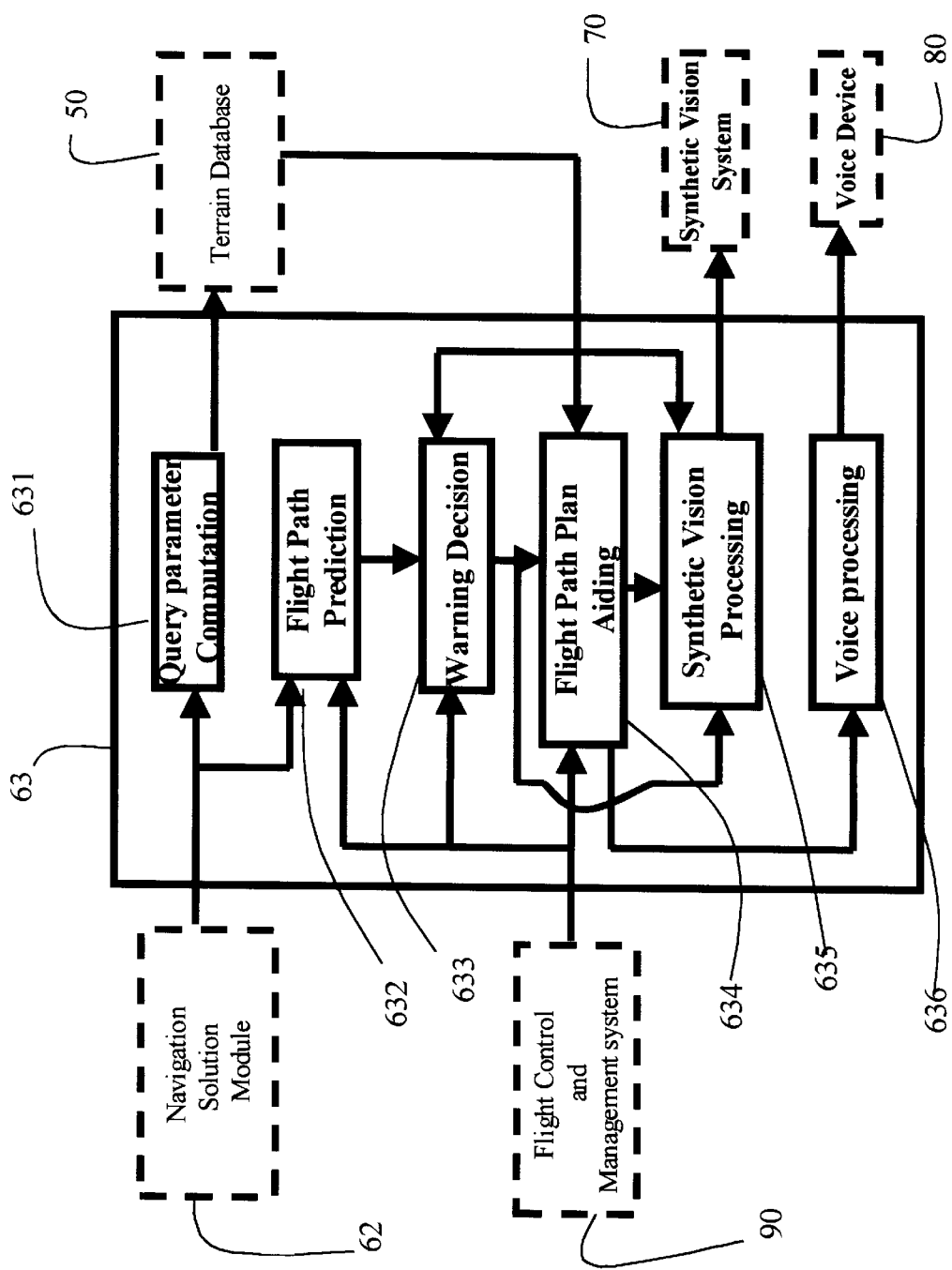
FIG. 7 is a block diagram illustrating the ground proximity warning solution module 63.

Referring to FIG. 7, the ground proximity warning solution module 63 further comprises a query parameter computation 631, a flight path prediction 632, a warning decision 633, a flight path plan aiding 634, a synthetic vision processing 635, and a voice processing 636.

The query parameter computation 631 receives the optimal navigation solution from the navigation solution module 62, computes the query parameters, and outputs the query parameters to the terrain database 50 to access the terrain data of the current vehicle position and surrounding terrain.

The flight path prediction 632 receives and collects the optimal navigation solution from the navigation solution module 62, and receives the vehicle performance and configuration data from the onboard flight control and management system 90, and predicts the projected flight path to a warning decision 633. In addition, The flight path prediction 632 passes the current vehicle position, velocity, and attitude to the warning decision 633.

The warning decision 633 receives the projected flight path from the flight path prediction 632, the vehicle performance and configuration data from the onboard flight control and management system 90, such as glide slope, landing gear, etc., and the surrounding terrain data from the terrain database 50. If the projected flight path is too close to the terrain, the warning decision 633 makes a warning decision message which are sent to a flight path plan aiding 634, a synthetic vision processing 635 and a voice processing 636. In addition, the warning decision 633 passes the current vehicle position, velocity, and attitude to the flight path plan aiding 634.

The flight path plan aiding 634 receives the warning decision message and the current vehicle position, velocity, and attitude information from the warning decision 633, the surrounding terrain data from the terrain database 50, and the vehicle performance and configuration data from the onboard flight control and management system 90, and processes these data, and provides an optimal evasion flight path to aid the flight crew.

The synthetic vision processing 635 receives the projected flight path and warning decision message from the warning decision 633, the surrounding terrain data from the terrain database 50, and the suggested optimal evasion flight path from the flight path plan aiding 634, and provides the driving data to the synthetic vision system 70.

The voice processing 636 receives the projected flight path and warning decision message from the warning decision 633, the surrounding terrain data from the terrain database 50, and the suggested optimal evasion flight path from the flight path plan aiding 634, and provides the driving data to the voice device 80.

Referring to FIG. 1, the integrated positioning and ground proximity warning method comprises the following steps:

1. Receive global positioning system signals for deriving position, velocity and time information or pseudorange and delta range measurements of the global positioning system, which are output to an integrated positioning/ground proximity warning system processor.

2. Receive vehicle angular rate and specific force information and solve inertial navigation equations for obtaining the inertial navigation solution, such as position, velocity, and attitude, which is output to the integrated positioning/ground proximity warning processor.

3. Measure air pressure and compute barometric measurements which is output to the integrated positioning/ground proximity warning processor.

4. Measure the time delay between transmission and reception the radio signal from the terrain surface and compute radio altitude measurement which is output to the integrated positioning/ground proximity warning processor.

5. Access an onboard terrain database or access a ground-based terrain database by a data link for obtaining the current vehicle position and surrounding terrain height data which is output to the integrated positioning/ground proximity warning processor.

6. Receive position, velocity and time information or pseudorange and delta range measurements of the global positioning system, the inertial navigation solution, radio altitude measurement, radio altitude measurement, and the current vehicle position and surrounding terrain height data, and compute optimal positioning solution and optimal ground proximity warning solution.

Referring to FIG. 8, in step 1, the optimal vehicle position, velocity, acceleration, and attitude solution data received from step 6 is used to aid the signal tracking, acquisition, and reacquisition processing in the signal processor 16 of the global positioning system receiver 10 to obtain improved performance.

Referring to FIG. 9, in step 2, error feedback calibration methods in the error compensation 23, the transformation matrix computation 24, and the attitude position velocity computation 27 of the inertial navigation system 20 are performed using the optimal estimates of position errors, velocity errors and attitude errors of the inertial navigation solution and inertial sensor measurement errors from the 6 to obtain improved performance.

Referring to FIG. 2 and FIG. 7, a synthetic vision processing can be added to the step 6, in which the ground proximity warning solution is further processed to obtain an enhanced vision display for the flight crew.

Referring to FIG. 2 and FIG. 7, a voice processing can be added to the step 6, in which the ground proximity warning solution is further processed to obtain audible ground proximity warning messages for the flight crew.

The step 1~5 may be performed in parallel and in serial way.

Referring to FIG. 1 and FIG. 8, the step 1 further comprises the steps of:

1-1) receiving a radio frequency (RF) signal of the global positioning system by the global positioning system antenna 11, wherein the radio frequency (RF) signal is sent to a preamplifier circuit 12;

1-2) amplifying the input radio frequency (RF) signal of the global positioning system by preamplifier circuit 12 to improve its signal-noise ratio, and is output to the down converter 13;

1-3) converting the amplified radio frequency (RF) signal of the global positioning system by the down converter 13 by mixing with the local referencing signal from the oscillator 17 to the intermediate frequency (IF) signals, which is analog in-phase (I) and quadraphase (Q), wherein the IF signal is output to the band pass filter 14;

1-4) filtering the input IF signals by the band pass filter 14 to filter out and filtering out the noise of the input IF signals to improve their signal-noise ratio, wherien the filtered IF signals are sent to the IF sampling and A/D convert 15;

1-5) sampling the input IF signals in the IF sampling and A/D converter 15 to form the digital in-phase (I) and quadraphase (Q) signals which are output to the signal processor 16;

1-6) performing the signal acquisition, tracking, and reacquisition processing of the global positioning system in the signal processor 16 by using the input digital in-phase (I) and quadraphase (Q) signals, which are aided by the optimal vehicle position, velocity, acceleration, and attitude solution data provided the integrated positioning/ground proximity warning system processor 60, and for computing the pseudorange, delta range, and satellite ephemeris of the global positioning system, which is output to the navigation processor 18;

1-7) obtaining vehicle position, velocity, and time information by using the input pseudorange, delta range, and satellite ephemeris of the global positioning system to perform navigation computation in the navigation processor 18, wherein the Vehicle position, velocity, and time information, or input pseudorange, delta range, and satellite ephemeris are sent to the integrated positioning/ground proximity warning system processor 60.

Referring to FIG. 1 and FIG. 9, the step 2 further comprises the following steps:

2-1) Measure a vehicle body angular rates and specific force information by the inertial measurement unit 21, which are output to the error compensation 23.

2-2) Compensate the body angular rates and specific forces in the error compensation 23 with optimal estimates of inertial sensor errors from the integrated positioning/ground proximity warning system processor 60.

2-3) Update a transformation matrix from the body frame (b frame) to the n frame by using the compensated body angular rates and the rotation rate vector of the local navigation frame (n frame) with respect to the inertial frame (i frame) from an earth and vehicle rate computation 26, wherein the updated transformation matrix is compensated with the optimal estimates of attitude errors from the integrated positioning/ground proximity warning system processor 60 to remove attitude errors.

The way to update the transformation matrix is by the Euler method, or the direction cosine method, or the quaternion method, The compensated transformation matrix is sent to the coordinate transformation computation 25 and the attitude position velocity computation 27.

2-4) Transform the compensated specific force input from the step 2-2, which is expressed in the body frame, in the coordinate transformation computation 25 to the specific force expressed in the navigation frame. The specific force expressed in the navigation frame is output to the attitude position velocity computation 27.

2-5)—Compute the position and velocity by using the input specific force expressed in the navigation frame, which are further compensated with the optimal estimates of position errors and velocity errors from the integrated positioning/ground proximity warning system processor 60. The compensated transformation matrix from the step 2-3 is used to compute vehicle attitude. The compensated the position, velocity, and computed attitude are output to the Earth and vehicle rate computation 26 and the integrated positioning/ground proximity warning system processor 60.

2-6) The compensated the position, velocity, and computed attitude are used to compute a rotation rate vector of the local navigation frame (n frame) relative to the inertial frame (i frame) in the Earth and vehicle rate computation 26, which is output to the step 2-3.

In the step 3, an air pressure is measured by the baro altimeter 30 and transformed to the baro altitude measurements, which is sent to the integrated positioning/ground proximity warning system processor 60.

In the step 4, a radio signal is sent by the radio altimeter 40; the echoes of the radio from the terrain surface is received by the radio altimeter 40; the time delay between transmission and reception of the radio signal is measured and transformed to the radio altitude measurement by the radio altimeter 40, which are output to the integrated positioning/ground proximity warning system processor 60.

Referring to FIG. 2, the step 6 further comprises the following steps:

6-1) Accept position, velocity and time information or pseudorange and delta range measurements of the global positioning system receiver, the inertial navigation solution, radio altitude measurement, radio altitude measurement, and the current vehicle position and surrounding terrain height data from the step 1~step 5 through an input/output module 61.

6-2) The accepted position, velocity and time information or pseudorange and delta range measurements of the global positioning system, the inertial navigation solution, radio altitude measurement, radio altitude measurement, and the current vehicle position and surrounding terrain height data are used to compute optimal position, velocity, and attitude in a navigation solution module 62, by the following variable ways to obtain different degrees of performance of the system of the present invention:

6-2 (a). Referring to FIG. 3, individual radio altimeter measurements from the radio altimeter 40, barometric altimeter measurements from the baro altimeter 30, and terrain data from the terrain database 50 are input to a correlation/matching 6201 through the input/output module 61. The individual radio altimeter measurements and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6201. Once a match is found, the geographic coordinates of the best matching reference profile is passed to a filter/estimator 6202.

In addition, the result of adding radio altimeter measurements with terrain height of the current vehicle position is different with the inertial altitude solution (or hybrid baro/inertial altitude measurement) in the correlation/matching 6201 to form altitude measurement residues, which is passed to the filter/estimator 6202.

The measurements from the global positioning system receiver 10, the inertial navigation solution from the inertial navigation system 20, and the geographic coordinates of the best matching reference profile and altitude measurement residues from the correlation/matching 6201 are filtered by the filter/estimator 6202 processes to obtain optimal estimates of the inertial navigation solution errors, errors of the global position system receiver, and errors of inertial sensors in a centralized filtering fashion, which is used to obtain the optimal positioning solution using the following two steps:

6-2(a)-1. Compensate the inertial navigation solution from the inertial navigation system 20 with the optimal estimates of the navigation solution errors in the filter/estimator 6202

6-2(a)-2. Feed back the optimal estimates of the inertial navigation solution errors and the inertial sensor errors to the inertial navigation system 20 to calibrate the errors.

6-2(b). Referring to FIG. 4, individual radio altimeter measurements from the radio altimeter 40, barometric altimeter measurements from the baro altimeter 30, and terrain data from the terrain database 50 are input to the correlation/matching 6211 through the input/output module 61. The individual radio altimeter measurements and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6211. Once a match is found, the geographic coordinates of the best matching reference profile is passed to a TAINS local filter 6212.

In addition, the result of adding radio altimeter measurements with terrain height of the current vehicle position is different with the inertial altitude solution (or hybrid baro/inertial altitude measurement) in the correlation/matching 6211 to form altitude measurement residues to the TAINS local filter 6212.

The inertial navigation solution errors and inertial sensor errors are modeled by the TAINS local filter 6212, and the obtained geographic coordinates of the best matching reference profile and altitude measurement residues are filtered by the TAINS local filter 6212 to obtain the local optimal estimates of inertial navigation solution errors and inertial sensor errors.

The measurements from the global positioning system receiver 10 and the inertial navigation solution from the inertial navigation system 20 are accepted and filtered by a INSGPS local filter 6213 to obtain the local optimal estimates of inertial navigation solution errors, global position system receiver errors, and inertial sensor errors.

The local optimal estimates and covariance matrix of inertial navigation solution errors, errors of the global position system receiver, and errors of the inertial sensor from the INSGPS local filter 6213 and the local optimal estimates and covariance matrix of the inertial navigation solution errors and errors of the inertial sensor from the TAINS local filter 6212 are accepted by a master filter 6214 and are filtered to provide the global optimal estimates of inertial navigation solution errors, the global position system receiver errors, and the inertial sensor errors.

The global optimal estimates of inertial navigation solution errors, the global position system receiver errors, and the inertial sensor errors and the covariance matrix obtained by the master filter 6214 are fed back to the INSGPS local filter 6213 and the TAINS local filter 6212 to reset the INSGPS local filter 6213 and the TAINS local filter 6212 and perform information-sharing among the master filter 6214, the INSGPS local filter 6213, and the TAINS local filter 6212.

The communication and estimation between the master filter 6214, the INSGPS local filter 6213, and the TAINS local filter 6212 may have different approaches to obtain different system performances.

The consistency test among the state estimates of the master filter 6214, the INSGPS local filter 6213, and the TAINS local filter 6212 can be performed by the master filter 6214 to detect and isolate the malfunction of a satellite of the global positioning system and to reconfigure the structure and process of the navigation solution module 62.

The optimal positioning solution can be obtained by the following two methods:

6-2(b).1. Compensate the inertial navigation solution from the inertial navigation system 20 with the optimal estimates of the navigation solution errors in the master filter 6214.

6-2(b).2. Feed back the optimal estimates of the inertial navigation solution errors and inertial sensor errors to the inertial navigation system 20 to calibrate the errors.

6-2(c). Referring to FIG. 5, the inertial navigation solution from the inertial navigation system 20, the baro altitude measurement from the baro altimeter 30, the radio altitude measurement from the radio altimeter 40, and terrain data from the terrain database 50 are inputs to an individual terrain clearance computation 6221.

The individual baro altitude measurements (or hybrid baro/inertial altitude measurement) is subtracted by the height of terrain at the current position to form the referenced individual terrain-clearance measurement. The radio altitude measurement is the individual measured terrain-clearance measurement. The deference between the measured terrain-clearance measurement and a referenced terrain-clearance measurement is output by the individual terrain clearance computation 6221 to a filter/estimator 6222.

Due to the undulating nature of terrain, the terrain-clearance measurement is a nonlinear function of vehicle position. Furthermore, the difference between the measured terrain-clearance measurement and the referenced terrain-clearance measurement is a function of the inertial navigation solution errors.

The terrain clearance measurement equation is theoretically a nonlinear function of the antenna pattern of the radio altimeter 40, the cross-range/downrange position, altitude, and attitude of the vehicle. Generally, a reasonable approximation to the k th referenced terrain clearance measurement is $$TC_k = h_{INS} - h(X_k, Y_k) + v_k \tag{1}$$

where, $TC_k$ is the k th referenced terrain clearance measurement; $h_{INS}$ is the height of the vehicle indicated by the inertial navigation system 20 or hybrid baro/inertail altitude measurement; $h(X_k, Y_k)$ is the height of the terrain at the position (X,Y) indicated by the inertial navigation system 20; $v_k$ is the error of the terrain database 50.

The measurements from the global positioning system receiver 10, inertial navigation solution from the inertial navigation system 20, and the difference between the measured terrain-clearance measurement and referenced terrain-clearance measurement from the individual terrain clearance computation 6221 are filtered by the filter/estimator 6222 processes in a centralized filtering fashion to obtain optimal estimates of the inertial navigation solution errors, the global position system receiver errors, and the inertial sensor errors.

Because the $h(X_k, Y_k)$ is a nonlinear function of the position (XY), the filter/estimator 6222 is a nonlinear filter/estimator.

The optimal positioning solution can be obtained by using the following two methods:

6-2(c)-1. Compensate the inertial navigation solution from the inertial navigation system 20 with the optimal estimates of the navigation solution errors in the filter/estimator 6222.

6-2(c)-2. Feed back the optimal estimates of the inertial navigation solution errors and the inertial sensor errors to the inertial navigation system 20 to calibrate the errors.

6-2(d). Referring to FIG. 6, the inertial navigation solution from the inertial navigation system 20, the baro altitude measurement from the baro altimeter 30, the radio altitude measurement from the radio altimeter 40, and terrain data from the terrain database 50 are inputs to an individual terrain clearance computation 6231. The individual baro altitude measurements (or hybrid baro/inertail altitude measurement) is subtracted by the height of terrain at the current position to form the referenced individual terrain-clearance measurement. The radio altitude measurement is the individual measured terrain-clearance measurement. The individual terrain clearance computation 6231 outputs the difference between the measured terrain-clearance measurement and the referenced terrain-clearance measurement to a TAINS local filter 6232.

The inertial navigation solution errors and inertial sensor errors are modeled the TAINS local filter 6232, and the difference between the measured terrain-clearance measurement and the referenced terrain-clearance measurement is filtered by the TAINS local filter 6232 to obtain the local optimal estimates of inertial navigation solution errors and inertial sensor errors.

Because the $h(X_k, Y_k)$ is a nonlinear function of the position (X,Y), the TAINS local filter 6232 is a nonlinear filter/estimator or extended Kalman filter.

The measurements of GPS from the global positioning system receiver 10 and the inertial navigation solution from the inertial navigation system 20 are accepted and processed by an INSGPS local filter 6233 to obtain the local optimal estimates of inertial navigation solution errors, the global position system receiver errors, and the inertial sensor errors.

The local optimal estimates and covariance matrix of the inertial navigation solution errors, the global position system receiver errors, and the inertial sensor errors from the INSGPS local filter 6233 and the local optimal estimates and covariance matrix of the inertial navigation solution errors and the inertial sensor errors from the TAINS local filter 6232 are filtered by the master filter 6234 and provides the global optimal estimates of inertial navigation solution errors, errors of global position system receiver, and errors of inertial sensor.

The global optimal estimates of inertial navigation solution errors, the global position system receiver errors, and the inertial sensor errors and the covariance matrix obtained by the master filter 6234 are fed back to the INSGPS local filter 6233 and the TAINS local filter 6232 to reset the INSGPS local filter 6233 and the TAINS local filter 6232 and perform information-sharing among the master filter 6234, the INSGPS local filter 6233, and the TAINS local filter 6232.

The communication and estimation among the master filter6234, the INSGPS local filter 6233, and the TAINS local filter 6232 may have different approaches to obtain different system performance.

The consistency test among the state estimates of the master filter 6234, the INSGPS local filter 6233, and the TAINS local filter 6232 can also be performed by the master filter 6234 to detect and isolate the malfunction of the satellite of the global positioning system and to reconfigure the structure and process of the navigation solution module.

The optimal positioning solution can be obtained using the following two methods:

6-2(d)-1. Compensate the inertial navigation solution from the inertial navigation system 20 with the optimal estimates of the navigation solution errors in the master filter 6234.

6-2(d)-2. Feed back the optimal estimates of the inertial navigation solution errors and the inertial sensor errors to the inertial navigation system 20 to calibrate the errors.

6-3) Referring to FIG. 2, input the optimal navigation solution from the navigation solution module 62, the surrounding terrain data from the terrain database 50, and the vehicle performance and configuration data from the onboard flight control and management system 90, and compute the ground proximity warning solution. Referring to FIG. 7, the step 6-3 comprises the following steps:

6-3(a) Compute the query parameters using the optimal navigation solution from the navigation solution module 62 in the query parameter computation 631, which is sent to the terrain database 50 to access the terrain data of the current vehicle position and surrounding terrain.

6-3 (b) Predict the projected flight path to the warning decision 633, using the accepted optimal navigation solution from the navigation solution module 62 received and collected by the flight path prediction 632, and the vehicle performance and configuration data from the onboard flight control and management system 90 received by the flight path prediction 632.

6-3(c) Compute and compare, using the accepted projected flight path from the flight path prediction 632, the vehicle performance and configuration data from the onboard flight control and management system 90, such as glide slope, landing gear, etc., and the surrounding terrain data from the terrain database 50 in the warning decision 633 receives. If the projected flight path is too close to the terrain, a warning decision message are made by the warning decision 633 which are sent to the flight path planning aiding 634, the synthetic vision processing 635 and the voice processing 636.

6-3(d) Receive the warning decision message and the current vehicle position, velocity, and attitude information from the warning decision 633 and the surrounding terrain data from the terrain database 50, and the vehicle performance and configuration data from the onboard flight control and management system 90, and compute an optimal evasion flight path to aid the flight crew in the flight path plan aiding 634, 6-4(e) Rreceive the projected flight path and warning decision message from the warning decision 633, the surrounding terrain data from the terrain database 50, and the suggested optimal evasion flight path from the flight path plan aiding 634, and compute the driving data in the synthetic vision processing 635 for the synthetic vision system 70.

6-2(f) Receive the projected flight path and warning decision message from the warning decision 633, the surrounding terrain data from the terrain database 50, and the suggested optimal evasion flight path from the flight path plan aiding 634, and compute the driving data in the voice processing 636 for the voice device 80.

What is claimed is:

1. A positioning and ground proximity warning method for vehicle, comprising the steps of:
   (a) receiving global positioning system information for deriving position, velocity and time information or pseudorange and delta range measurements of a global positioning system, and outputting said global positioning system information to an integrated positioning/ground proximity warning system processor;
   (b) receiving vehicle angular rate and specific force information for computing an inertial navigation solution, including position, velocity, and attitude of said vehicle, by solving inertial navigation equations, and outputting said inertial navigation solution to said integrated positioning/ground proximity warning processor;
   (c) measuring air pressure, and computing barometric measurements which is output to said integrated positioning/ground proximity warning processor;
   (d) measuring time delay between transmission and reception of a radio signal from a terrain surface, and computing radio altitude measurement which is output to said integrated positioning/ground proximity warning processor;
   (e) accessing a terrain database for obtaining current vehicle position and surrounding terrain height data which is output to said integrated positioning/ground proximity warning processor; and
   (f) receiving said position, velocity and time information or said pseudorange and delta range measurements of said global positioning system, said inertial navigation solution, said radio altitude measurement, and said current vehicle position and surrounding terrain height data, and computing optimal positioning solution data and optimal ground proximity warning solution data.

2. A positioning and ground proximity warning method for vehicle, as recited in claim 1, wherein step (b) further comprises an additional step of receiving an optimal estimates of position errors, velocity errors and attitude errors of said inertial navigation solution and an inertial sensor measurement errors from the step (f) and performing an error feedback calibration of said inertial navigation solution to obtain improved performance.

3. A positioning and ground proximity warning method for vehicle, as recited in claim 1, wherein the step (f) comprises the steps of:
   (f-1) accepting said position, velocity and time information or said pseudorange and delta range measurements of said global positioning system, said inertial navigation solution, said radio altitude measurement, and said current vehicle position and surrounding terrain height data;
   (f-2) computing optimal navigation, including position, velocity, and attitude, by using said accepted position, velocity and time information of said global positioning system, said inertial navigation solution, said radio altitude measurement, and said current vehicle position and surrounding terrain height data; and
   (f-3) inputting said optimal navigation solution, said surrounding terrain data from said terrain database, and a vehicle performance and configuration data from a onboard flight control and management system, and computing said ground proximity warning solution.

4. A positioning and ground proximity warning method for vehicle, as recited in claim 2, wherein the step (f) comprises the steps of:
   (f-1) accepting said position, velocity and time information or said pseudorange and delta range measurements of said global positioning system, said inertial navigation solution, said radio altitude measurement, and said current vehicle position and surrounding terrain height data;
   (f-2) computing optimal navigation, including position, velocity, and attitude, by using said accepted position, velocity and time information of said global positioning system, said inertial navigation solution, said radio altitude measurement, and said current vehicle position and surrounding terrain height data; and
   (f-3) inputting said optimal navigation solution, said surrounding terrain data from said terrain database, and a vehicle performance and configuration data from an onboard flight control and management system, and computing said ground proximity warning solution.

5. A positioning and ground proximity warning method for vehicle, as recited in claim 3, wherein the step (f-3) comprises the steps of:
   computing query parameters using said optimal navigation solution, which is sent to said terrain database to access said terrain data of said current vehicle position and surrounding terrain;
   predicting a projected flight path by using said accepted optimal navigation solution and said vehicle performance and configuration data from said onboard flight control and management system;
   computing and comparing, using said accepted projected flight path, said vehicle performance and configuration data from said onboard flight control and management system, and said surrounding terrain data from said terrain database, in which when said projected flight path is too close to the terrain, a warning decision message is made; and
   receiving said warning decision message and said current vehicle position, velocity, and attitude information and said surrounding terrain data from said terrain database, and said vehicle performance and configuration data from said onboard flight control and management system, and computing an optimal evasion flight path.

6. A positioning and ground proximity warning method for vehicle, as recited in claim 4, wherein the step (f-3) comprises the steps of:
   computing query parameters using said optimal navigation solution, which is sent to said terrain database to access said terrain data of said current vehicle position and surrounding terrain;
   predicting a projected flight path by using said accepted optimal navigation solution and said vehicle performance and configuration data from said onboard flight control and management system;
   computing and comparing, using said accepted projected flight path, said vehicle performance and configuration data from said onboard flight control and management system, and said surrounding terrain data from said terrain database, in which when said projected flight path is too close to the terrain, a warning decision message is made; and receiving said warning decision message and said current vehicle position, velocity, and attitude information and said surrounding terrain data from said terrain database, and said vehicle performance and configuration data from said onboard flight control and management system, and computing an optimal evasion flight path.

7. A positioning and ground proximity warning method for vehicle, as recited in claim 6, wherein the step (f-2) comprises the steps of individually inputting said radio altimeter measurement from a radio altimeter, said barometric altimeter measurement from a baro altimeter, and said terrain data from said terrain database to a correlation/matching;

individually collecting said radio altimeter measurement and said barometric altimeter measurement to construct a measured profile of terrain in an assigned time window, wherein said terrain data is collected to construct a set of prestored reference terrain profiles which correspond to an area over which said vehicle is flying during said assigned window time, and then comparing said measured terrain profile with said set of prestored reference terrain profiles, in which once a match is found, geographic coordinates of the best matching reference profile is passed to a filter/estimator;

forming altitude measurement residues which are passed to said filter/estimator by resulting of adding radio altimeter measurements with terrain height of the current vehicle position being differenced with the inertial altitude solution (or hybrid baro/inertial altitude measurement);

filtering said position and said velocity or said pseudorange and delta range measurements of said global positioning system, said inertial navigation solution, and said geographic coordinates of said best matching reference profile and said altitude measurement residues by said filter/estimator to obtain optimal estimates of said inertial navigation solution errors, errors of said global position system receiver, and errors of said inertial sensors in a centralized filtering fashion and feeding back said optimal estimates of said inertial navigation solution errors and said inertial sensor errors to said inertial navigation system to calibrate errors of said inertial navigation solution.

8. A positioning and ground proximity warning method for vehicle, as recited in claim 6, wherein the step (f-2) comprises the steps of:

individually inputting said radio altimeter measurement from a radio altimeter, said barometric altimeter measurement from a baro altimeter, and said terrain data from said terrain database to a correlation/matching;

individually collecting said radio altimeter measurement and said barometric altimeter measurement to construct said measured profile of terrain in said assigned time window, wherein said terrain data is collected to construct a set of prestored reference terrain profiles which correspond to said area over which said vehicle is flying during said assigned window time, and then comparing said measured terrain profile with said set of prestored reference terrain profiles in said correlation/matching, wherein when a match is found, geographic coordinates of the best matching reference profile is passed to a TAINS local filter;

forming altitude measuremnet residues to said TAINS local filter by resulting of adding said radio altimeter measurements with terrain height of said current vehicle position being differenced with said inertial altitude solution (or hybrid baro/inertial altitude measurement) in said correlation/matching;

filtering said obtained geographic coordinates of said best matching reference profile and said altitude measurement residues by said TAINS local filter to obtain a local optimal estimates of said inertial navigation solution errors and said inertial sensor errors, accepting and filtering said position and velocity or pseudorange and delta range measurements of said global positioning system and said inertial navigation solution by a INSGPS local filter to obtain another local optimal estimates of said inertial navigation solution errors, said global position system receiver errors, and said inertial sensor errors;

accepting said local optimal estimates and covariance matrix of said inertial navigation solution errors, errors of said global position system receiver, and errors of said inertial sensor from said INSGPS local filter and said local optimal estimates and covariance matrix of said inertial navigation solution errors and errors of said inertial sensor from said TAINS local filter by a master filter, which are filtered to provide a global optimal estimates of said inertial navigation solution errors, said global position system receiver errors, and said inertial sensor errors;

feeding back said global optimal estimates of inertial navigation solution errors, said global position system receiver errors, and said inertial sensor errors and a covariance matrix obtained by said master filter to said INSGPS local filter and said TAINS local filter to reset said INSGPS local filter and said TAINS local filter, and to perform information-sharing among said master filter, said INSGPS local filter, and said TAINS local filter, tuning communication and estimation format between said master filter, said INSGPS local filter, and said TAINS local filter;

performing a consistency test among said state estimates of said master filter, said INSGPS local filter, and said TAINS local filter by said master filter for detecting and isolating a malfunction of a satellite of said global positioning system and to reconfigure the structure and process of said navigation solution; and feeding back said optimal estimates of said inertial navigation solution errors and inertial sensor errors to said inertial navigation system to calibrate errors of said inertial navigation solution.

9. A positioning and ground proximity warning method for vehicle, as recited in claim 6, wherein the step (f-2) comprises the steps of:

inputting said inertial navigation solution from said inertial navigation system, said baro altitude measurement from said baro altimeter, said radio altitude measurement from said radio altimeter, and said terrain data from said terrain database to an individual terrain clearance computation;

substracting said individual baro altitude (or hybrid baro/inertial altitude measurement) by a height of said terrain at a current vehicle position to form a referenced individual terrain-clearance measurement, wherein said radio altitude measurement is an individual measured terrain-clearance measurement, a deference between said measured terrain-clearance measurement, and said referenced terrain-clearance measurement is output by said individual terrain clearance computation to a filter/estimator, which is a nonlinear filter/estimator;

filtering said position and velocity or said pseudorange and delta range measurements of said global positioning system, said inertial navigation solution from said inertial navigation system, and said difference between said measured terrain-clearance measurement and said referenced terrain-clearance measurement from said individual terrain clearance computation by said filter/estimator in a centralized filtering fashion to obtain optimal estimates of said inertial navigation solution errors, said global position system receiver errors, and said inertial sensor errors; and feeding back said optimal estimates of said inertial navigation solution errors and said inertial sensor errors to said inertial navigation system to calibrate errors of said inertial navigation solution.

10. A positioning and ground proximity warning method for vehicle, as recited in claim 6, wherein the above step (f-2) further comprises the following steps:

inputting said inertial navigation solution from said inertial navigation system, said baro altitude measurement from said baro altimeter, said radio altitude measurement from said radio altimeter, and said terrain data from said terrain database to an individual terrain clearance computation;

individually substracting said baro altitude measurement (or hybrid baro/inertail altitude measurement) by a height of said terrain at a current vehicle position to form said referenced individual terrain-clearance measurement, wherein said radio altitude measurement is said individual measured terrain-clearance measurement, and then outputting a difference between said measured terrain-clearance measurement and said referenced terrain-clearance measurement by said individual terrain clearance computation to a TAINS local filter;

modeling said inertial navigation solution errors and inertial sensor errors by said TAINS local filter, and filtering said difference between said measured terrain-clearance measurement and said referenced terrain-clearance measurement by said TAINS local filter to obtain said local optimal estimates of said inertial navigation solution errors and said inertial sensor errors, wherein said TAINS local filter is a nonlinear filter/estimator or extended Kalman filter;

accepting and processing said position and velocity or pseudorange and delta range measurements of said global positioning system and said inertial navigation solution from said inertial navigation system by an INSGPS local filter to obtain another local optimal estimates of said inertial navigation solution errors, said global position system receiver errors, and said inertial sensor errors;

filtering said local optimal estimates and covariance matrix of said inertial navigation solution errors, said global position system receiver errors, and said inertial sensor errors from said INSGPS local filter and said local optimal estimates and covariance matrix of said inertial navigation solution errors and said inertial sensor errors from said TAINS local filter by a master filter to provide said global optimal estimates of said inertial navigation solution errors, said errors of said global position system receiver, and errors of said inertial sensor;

feeding back said global optimal estimates of said inertial navigation solution errors, said global position system receiver errors, and said inertial sensor errors and said covariance matrix obtained by said master filter to said INSGPS local filter and said TAINS local filter to reset said INSGPS local filter and said TAINS local filter, and to perform information-sharing among said master filter, said INSGPS local filter, and said TAINS local filter;

tuning communication and estimation among said master filter, said INSGPS local filter, and said TAINS local filter to obtain different system performances, performing a consistency test among the state estimates of said master filter, said INSGPS local filter, and said TAINS local filter by said master filter to detect and isolate said malfunction of said satellite of said global positioning system and to reconfigure the structure and process of said navigation solution; and feeding back said optimal estimates of said inertial navigation solution errors and said inertial sensor errors are fed back to said inertial navigation system to calibrate errors of said inertial navigation solution.

11. A positioning and ground proximity warning method for vehicle, as recited in claim 1, 7, 8, 9, or 10, wherein in the step (f) said optimal positioning solution data includes optimal vehicle position, velocity, acceleration, and attitude solution data, and that in the step (a) further comprises an additional step of receiving said optimal vehicle position, velocity, acceleration, and attitude solution data from the step (f) and aiding signal tracking, acquisition, and reacquisition processing of a global positioning system receiver of said global positioning system.

12. A positioning and ground proximity warning method for vehicle, as recited in claim 1, 7, 8, 9, or 10, after the step (f), further comprising an additional step of receiving said ground proximity warning solution, said optimal navigation solution, and said terrain data, and performing a synthetic vision processing to obtain an enhanced vision display for a flight crew.

13. A positioning and ground proximity warning method for vehicle, as recited in claim 11, after the step (f), further comprising an additional step of receiving said ground proximity warning solution, said optimal navigation solution, and said terrain data, and performing a synthetic vision processing to obtain an enhanced vision display for a flight crew.

14. A positioning and ground proximity warning method for vehicle, as recited in claim 1, 7, 8, 9, or 10, after the step (f), further comprising an additional step of receiving said ground proximity warning solution and performing a voice processing to obtain audible ground proximity warning messages for a flight crew.

15. A positioning and ground proximity warning method for vehicle, as recited in claim 11, after the step (f), further comprising an additional step of receiving said ground proximity warning solution and performing a voice processing to obtain audible ground proximity warning messages for a flight crew.

16. A positioning and ground proximity warning method for vehicle, as recited in claim 12, after the step (f), further comprising an additional step of receiving said ground proximity warning solution and performing a voice processing to obtain audible ground proximity warning messages for a flight crew.

17. A positioning and ground proximity warning method for vehicle, as recited in claim 13, after the step (f), further comprising an additional step of receiving said ground proximity warning solution and performing a voice processing to obtain audible ground proximity warning messages for a flight crew.

18. A positioning and ground proximity warning method for vehicle, as recited in claim 1, 7, 8, 9, or 10, wherein the step (a) comprises the steps of:

receiving a radio frequency (RF) signal of said global positioning system by said global positioning system antenna, wherein said radio frequency (RF) signal is sent to a preamplifier circuit;

amplifying said input radio frequency (RF) signal of said global positioning system by preamplifier circuit to improve its signal-noise ratio, and is output to said down converter;

converting said amplified radio frequency (RF) signal of said global positioning system by said down converter by mixing with said local referencing signal from said oscillator to said intermediate frequency (IF) signals, which is analog in-phase (I) and quadraphase (Q), wherin said IF signal is output to said band pass filter;

filtering said input IF signals by said band pass filter to filter out and filtering out said noise of said input IF signals to improve their signal-noise ratio, wherein said filtered IF signals are sent to said IF sampling and A/D converter;

sampling said input IF signals in said IF sampling and A/D converter to form said digital in-phase (I) and quadraphase (Q) signals which are output to said signal processor;

performing said signal acquisition, tracking, and reacquisition processing of said global positioning system in said signal processor by using said input digital in-phase (I) and quadraphase (Q) signals, which are aided by said optimal vehicle position, velocity, acceleration, and attitude solution data provided said integrated positioning/ground proximity warning system processor, and for computing said pseudorange, delta range, and satellite ephemeris of said global positioning system, which is output to said navigation processor; and obtaining vehicle position, velocity, and time information by using said input pseudorange, delta range, and satellite ephemeris of said global positioning system to perform navigation computation in said navigation processor, wherein said vehicle position, velocity, and time information, or input pseudorange, delta range, and satellite ephemeris are sent to said integrated positioning/ground proximity warning system processor.

19. A positioning and ground proximity warning method for vehicle, as recited in claim 11, wherein the step (a) comprises the steps of:

receiving a radio frequency (RF) signal of said global positioning system by said global positioning system antenna, wherein said radio frequency (RF) signal is sent to a preamplifier circuit;

amplifying said input radio frequency (RF) signal of said global positioning system by preamplifier circuit to improve its signal-noise ratio, and is output to said down converter;

converting said amplified radio frequency (RF) signal of said global positioning system by said down converter by mixing with said local referencing signal from said oscillator to said intermediate frequency (IF) signals, which is analog in-phase (I) and quadraphase (Q), wherin said IF signal is output to said band pass filter;

filtering said input IF signals by said band pass filter to filter out and filtering out said noise of said input IF signals to improve their signal-noise ratio, wherein said filtered IF signals are sent to said IF sampling and A/D converter;

sampling said input IF signals in said IF sampling and A/D converter to form said digital in-phase (I) and quadraphase (Q) signals which are output to said signal processor;

performing said signal acquisition, tracking, and reacquisition processing of said global positioning system in said signal processor by using said input digital in-phase (I) and quadraphase (Q) signals, which are aided by said optimal vehicle position, velocity, acceleration, and attitude solution data provided said integrated positioning/ground proximity warning system processor, and for computing said pseudorange, delta range, and satellite ephemeris of said global positioning system, which is output to said navigation processor; and obtaining vehicle position, velocity, and time information by using said input pseudorange, delta range, and satellite ephemeris of said global positioning system to perform navigation computation in said navigation processor, wherein said vehicle position, velocity, and time information, or input pseudorange, delta range, and satellite ephemeris are sent to said integrated positioning/ground proximity warning system processor.

20. A positioning and ground proximity warning method for vehicle, as recited in claim 12, wherein the step (a) comprises the steps of:

receiving a radio frequency (RF) signal of said global positioning system by said global positioning system antenna, wherein said radio frequency (RF) signal is sent to a preamplifier circuit;

amplifying said input radio frequency (RF) signal of said global positioning system by preamplifier circuit to improve its signal-noise ratio, and is output to said down converter;

converting said amplified radio frequency (RF) signal of said global positioning system by said down converter by mixing with said local referencing signal from said oscillator to said intermediate frequency (IF) signals, which is analog in-phase (I) and quadraphase (Q), wherin said IF signal is output to said band pass filter;

filtering said input IF signals by said band pass filter to filter out and filtering out said noise of said input IF signals to improve their signal-noise ratio, wherein said filtered IF signals are sent to said IF sampling and A/D converter;

sampling said input IF signals in said IF sampling and A/D converter to form said digital in-phase (I) and quadraphase (Q) signals which are output to said signal processor;

performing said signal acquisition, tracking, and reacquisition processing of said global positioning system in said signal processor by using said input digital in-phase (I) and quadraphase (Q) signals, which are aided by said optimal vehicle position, velocity, acceleration, and attitude solution data provided said integrated positioning/ground proximity warning system processor, and for computing said pseudorange, delta range, and satellite ephemeris of said global positioning system, which is output to said navigation processor; and obtaining vehicle position, velocity, and time information by using said input pseudorange, delta range, and satellite ephemeris of said global positioning system to perform navigation computation in said navigation processor, wherein said vehicle position, velocity, and time information, or input pseudorange, delta range, and satellite ephemeris are sent to said integrated positioning/ground proximity warning system processor.

21. A positioning and ground proximity warning method for vehicle, as recited in claim 14, wherein the step (a) comprises the steps of:

receiving a radio frequency (RF) signal of said global positioning system by said global positioning system antenna, wherein said radio frequency (RF) signal is sent to a preamplifier circuit;

amplifying said input radio frequency (RF) signal of said global positioning system by preamplifier circuit to improve its signal-noise ratio, and is output to said down converter;

converting said amplified radio frequency (RF) signal of said global positioning system by said down converter by mixing with said local referencing signal from said oscillator to said intermediate frequency (IF) signals, which is analog in-phase (I) and quadraphase (Q), wherin said IF signal is output to said band pass filter;

filtering said input IF signals by said band pass filter to filter out and filtering out said noise of said input IF signals to improve their signal-noise ratio, wherein said filtered IF signals are sent to said IF sampling and A/D converter;

sampling said input IF signals in said IF sampling and A/D converter to form said digital in-phase (I) and quadraphase (Q) signals which are output to said signal processor;

performing said signal acquisition, tracking, and reacquisition processing of said global positioning system in said signal processor by using said input digital in-phase (I) and quadraphase (Q) signals, which are aided by said optimal vehicle position, velocity, acceleration, and attitude solution data provided said integrated positioning/ground proximity warning system processor, and for computing said pseudorange, delta range, and satellite ephemeris of said global positioning system, which is output to said navigation processor; and obtaining vehicle position, velocity, and time information by using said input pseudorange, delta range, and satellite ephemeris of said global positioning system to perform navigation computation in said navigation processor, wherein said vehicle position, velocity, and time information, or input pseudorange, delta range, and satellite ephemeris are sent to said integrated positioning/ground proximity warning system processor.

22. A positioning and ground proximity warning method, as recited in one of claim 1, 7, 8, 9, or 10, wherein the step (b) comprises the steps of:

step b-1, measuring said vehicle angular rate and specific force information by an inertial measurement unit, and outputting said vehicle angular rate and specific force information to an error compensation;

step b-2, compensating said vehicle angular rate and specific force information in said error compensation with optimal estimates of inertial sensor errors from said integrated positioning/ground proximity warning system processor;

step b-3, updating a transformation matrix from a body frame (b frame) to a local navigation frame (n frame) by using said compensated vehicle angular rate and a rotation rate vector of said local navigation frame (n frame) with respect to an inertial frame (i frame) from an earth and vehicle rate computation, wherein said updated transformation matrix is compensated with said optimal estimates of attitude errors from said integrated positioning/ground proximity warning system processor to remove attitude errors, wherein said compensated transformation matrix is sent to a coordinate transformation computation and an attitude position velocity computation;

step b-4, transforming said compensated specific force, which is expressed in said body frame, in said coordinate transformation computation to said specific force expressed in said navigation frame, said specific force expressed in said navigation frame being output to said attitude position velocity computation;

step b-5, computing said position and velocity by using said input specific force expressed in said navigation frame, which are further compensated with said optimal estimates of position errors and velocity errors from said integrated positioning/ground proximity warning system processor, said compensated transformation matrix from the step b-3 is used to compute vehicle attitude, said compensated said position, velocity, and computed attitude being output to said earth and vehicle rate computation and said integrated positioning/ground proximity warning system processor; and step b-6, by using said compensated said position, velocity, and computed attitude, computing a rotation rate vector of said local navigation frame (n frame) with respect to said inertial frame (i frame) in said earth and vehicle rate computation, and outputting said rotation rate vector to the step b-3.

23. A positioning and ground proximity warning met hod, as recited in claim 11, wherein the step (b) comprises the steps of:

step b-1, measuring said vehicle angular rate and specific force information by an inertial measurement unit, and outputting said vehicle angular rate and specific force information to an error compensation;

step b-2, compensating said vehicle angular rate and specific force information in said error compensation with optimal estimates of inertial sensor errors from said integrated positioning/ground proximity warning system processor;

step b-3, updating a transformation matrix from a body frame (b frame) to a local navigation frame (n frame) by using said compensated vehicle angular rate and a rotation rate vector of said local navigation frame (n frame) with respect to an inertial frame (i frame ) from an earth and vehicle rate computation, wherein said updated transformation matrix is compensated with said optimal estimates of attitude errors from said integrated positioning/ground proximity warning system processor to remove attitude errors, wherein said compensated transformation matrix is sent to a coordinate transformation computation and an attitude position velocity computation;

step b-4, transforming said compensated specific force, which is expressed in said body frame, in said coordinate transformation computation to said specific force expressed in said navigation frame, said specific force expressed in said navigation frame being output to said attitude position velocity computation;

step b-5, computing said position and velocity by using said input specific force expressed in said navigation frame, which are further compensated with said optimal estimates of position errors and velocity errors from said integrated positioning/ground proximity warning system processor, said compensated transformation matrix from the step b-3 is used to compute vehicle attitude, said compensated said position, velocity, and computed attitude being output to said earth and vehicle rate computation and said integrated positioning/ground proximity warning system processor; and step b-6, by using said compensated said position, velocity, and computed attitude, computing a rotation rate vector of said local navigation frame (n frame) with respect to said inertial frame (i frame) in said earth and vehicle rate computation, and outputting said rotation rate vector to the step b-3.

24. A positioning and ground proximity warning method, as recited in claim 12, wherein the step (b) comprises the steps of:

step b-1, measuring said vehicle angular rate and specific force information by an inertial measurement unit, and outputting said vehicle angular rate and specific force information to an error compensation;

step b-2, compensating said vehicle angular rate and specific force information in said error compensation with optimal estimates of inertial sensor errors from said integrated positioning/ground proximity warning system processor;

step b-3, updating a transformation matrix from a body frame (b frame) to a local navigation frame (n frame) by using said compensated vehicle angular rate and a rotation rate vector of said local navigation frame (n frame) with respect to an inertial frame (i frame) from an earth and vehicle rate computation, wherein said updated transformation matrix is compensated with said optimal estimates of attitude errors from said integrated positioning/ground proximity warning system processor to remove attitude errors, wherein said compensated transformation matrix is sent to a coordinate transformation computation and an attitude position velocity computation;

step b-4, transforming said compensated specific force, which is expressed in said body frame, in said coordinate transformation computation to said specific force expressed in said navigation frame, said specific force expressed in said navigation frame being output to said attitude position velocity computation;

step b-5, computing said position and velocity by using said input specific force expressed in said navigation frame, which are further compensated with said optimal estimates of position errors and velocity errors from said integrated positioning/ground proximity warning system processor, said compensated transformation matrix from the step b-3 is used to compute vehicle attitude, said compensated said position, velocity, and computed attitude being output to said earth and vehicle rate computation and said integrated positioning/ground proximity warning system processor; and step b-6, by using said compensated said position, velocity, and computed attitude, computing a rotation rate vector of said local navigation frame (n frame) with respect to said inertial frame (i frame) in said earth and vehicle rate computation, and outputting said rotation rate vector to the step b-3.

25. A positioning and ground proximity warning method, as recited in claim 14, wherein the step (b) comprises the steps of:

step b-1, measuring said vehicle angular rate and specific force information by an inertial measurement unit, and outputting said vehicle angular rate and specific force information to an error compensation;

step b-2, compensating said vehicle angular rate and specific force information in said error compensation with optimal estimates of inertial sensor errors from said integrated positioning/ground proximity warning system processor;

step b-3, updating a transformation matrix from a body frame (b frame) to a local navigation frame (n frame) by using said compensated vehicle angular rate and a rotation rate vector of said local navigation frame (n frame) with respect to an inertial frame (i frame) from an earth and vehicle rate computation, wherein said updated transformation matrix is compensated with said optimal estimates of attitude errors from said integrated positioning/ground proximity warning system processor to remove attitude errors, wherein said compensated transformation matrix is sent to a coordinate transformation computation and an attitude position velocity computation;

step b-4, transforming said compensated specific force, which is expressed in said body frame, in said coordinate transformation computation to said specific force expressed in said navigation frame, said specific force expressed in said navigation frame being output to said attitude position velocity computation;

step b-5, computing said position and velocity by using said input specific force expressed in said navigation frame, which are further compensated with said optimal estimates of position errors and velocity errors from said integrated positioning/ground proximity warning system processor, said compensated transformation matrix from the step b-3 is used to compute vehicle attitude, said compensated said position, velocity, and computed attitude being output to said earth and vehicle rate computation and said integrated positioning/ground proximity warning system processor; and step b-6, by using said compensated said position, velocity, and computed attitude, computing a rotation rate vector of said local navigation frame (n frame) with respect to said inertial frame (i frame) in said earth and vehicle rate computation, and outputting said rotation rate vector to the step b-3.

26. A positioning and ground proximity warning method, as recited in claim 18, wherein the step (b) comprises the steps of:

step b-1, measuring said vehicle angular rate and specific force information by an inertial measurement unit, and outputting said vehicle angular rate and specific force information to an error compensation;

step b-2, compensating said vehicle angular rate and specific force information in said error compensation with optimal estimates of inertial sensor errors from said integrated positioning/ground proximity warning system processor;

step b-3, updating a transformation matrix from a body frame (b frame) to a local navigation frame (n frame)

by using said compensated vehicle angular rate and a rotation rate vector of said local navigation frame (n frame) with respect to an inertial frame (i frame) from an earth and vehicle rate computation, wherein said updated transformation matrix is compensated with said optimal estimates of attitude errors from said integrated positioning/ground proximity warning system processor to remove attitude errors, wherein said compensated transformation matrix is sent to a coordinate transformation computation and an attitude position velocity computation;

step b-4, transforming said compensated specific force, which is expressed in said body frame, in said coordinate transformation computation to said specific force expressed in said navigation frame, said specific force expressed in said navigation frame being output to said attitude position velocity computation;

step b-5, computing said position and velocity by using said input specific force expressed in said navigation frame, which are further compensated with said optimal estimates of position errors and velocity errors from said integrated positioning/ground proximity warning system processor, said compensated transformation matrix from the step b-3 is used to compute vehicle attitude, said compensated said position, velocity, and computed attitude being output to said earth and vehicle rate computation and said integrated positioning/ground proximity warning system processor; and step b-6, by using said compensated said position, velocity, and computed attitude, computing a rotation rate vector of said local navigation frame (n frame) with respect to said inertial frame (i frame) in said earth and vehicle rate computation, and outputting said rotation rate vector to the step b-3.

27. A positioning and ground proximity warning method for vehicle, as recited in claim 1, 7, 8, 9, or 10, wherein in the step (c), said air pressure is measured by a baro altimeter and transformed to baro altitude measurements, which are sent to said integrated positioning/ground proximity warning system processor.

28. A positioning and ground proximity warning method for vehicle, as recited in claims 26, wherein in the step (c), said air pressure is measured by a baro altimeter and transformed to baro altitude measurements, which are sent to said integrated positioning/ground proximity warning system processor.

29. A positioning and ground proximity warning method for vehicle, as recited in claim 1, 7, 8, 9, or 10, wherein in the step (d), said radio signal is sent by a radio altimeter; echoes of said radio signal from said terrain surface is received by said radio altimeter; said time delay between transmission and reception of said radio signal is measured and transformed to radio altitude measurement by said radio altimeter, which are output to said integrated positioning/ground proximity warning system processor.

30. A positioning and ground proximity warning method for vehicle, as recited in claim 26, wherein in the step (d), said radio signal is sent by a radio altimeter; echoes of said radio signal from said terrain surface is received by said radio altimeter; said time delay between transmission and reception of said radio signal is measured and transformed to radio altitude measurement by said radio altimeter, which are output to said integrated positioning/ground proximity warning system processor.

31. A positioning and ground proximity warning system for vehicle, comprising:

a global positioning system receiver for receiving global positioning system signals and deriving position, velocity and time information or pseudorange and delta range measurements of a global positioning system;

an inertial navigation system for solving navigation equations with angular rate and specific force information from an inertial measurement unit and obtaining an inertial navigation solution;

a baro altimeter for providing baro altitude measurements;

a radio altimeter for providing a radio altitude measurement from a terrain surface;

a terrain database for providing global terrain data and obtaining a terrain height of current vehicle position and surrounding terrain height data; and a positioning/ground proximity warning system processor for receiving positioning data including said position, velocity and time information or pseudorange and delta range measurements from said global positioning system receiver, said inertial navigation solution from said inertial navigation system, said baro altitude measurements from said baro altimeter, said radio altitude measurement from said radio altimeter, said terrain height of current vehicle position and surrounding terrain height data from said terrain database, and vehicle performance and configuration data from an onboard flight control and management system, and providing optimal position, velocity, attitude navigation information and an optimal ground proximity warning information.

32. A positioning and ground proximity warning system for vehicle, as recited as claim 31, wherein said terrain database is an onboard terrain database.

33. A positioning and ground proximity warning system for vehicle, as recited in claim 31, wherein said terrain database is a ground-based terrain database by means of a data link with said vehicle.

34. A positioning and ground proximity warning system for vehicle, as recited as claim 31, wherein said positioning/ground proximity warning system processor further comprises:

an input/output module for managing input and output of said positioning data and said onboard flight control and management system;

a navigation solution module, which is connected with said input/output module and a ground proximity warning solution module, for fusing informations from all sensors to obtain an optimal navigation solution, and outputting said obtained optimal navigation solution to said onboard flight control and management system and said ground proximity warning solution module, and outputting optimal position and velocity to said global positioning system receiver, and outputting optimal estimates of inertial navigation solution error and inertial sensor errors to said inertial navigation system; and a ground proximity warning solution module for receiving said optimal navigation solution, said terrain data, and said vehicle performance and configuration data from said onboard flight control and management system and obtain a ground proximity warning solution.

35. A positioning and ground proximity warning system for vehicle, as recited as claim 34, wherein said ground proximity warning solution module further comprise:

a query parameter computation module for receiving an optimal navigation solution from said navigation solution module, and computing query parameters, and outputting said query parameters to said terrain database to access said terrain data of said current vehicle position and surrounding terrain; and a flight path prediction module for receiving and collecting said optimal navigation solution from said navigation solution module, and receiving said vehicle performance and configuration data from said onboard flight control and management system, and predicting a projected flight path to a warning decision module and passing said current vehicle position, velocity, and attitude to said warning decision module;

wherein said warning decision module is adapted for receiving said projected flight path from said flight path prediction, said vehicle performance and configuration data from said onboard flight control and management system, including glide slope and landing gear, and said surrounding terrain data from said terrain database and making a warning decision message, which are sent to a flight path plan aiding module; and said flight path plan aiding module is adapted for receiving said warning decision message and said current vehicle position, velocity, and attitude information from said warning decision module, said surrounding terrain data from said terrain database, and said vehicle performance and configuration data from said onboard flight control and management system, and processing these data, and providing an optimal evasion flight path to aid a flight crew.

36. A positioning and ground proximity warning system for vehicle, as recited as claim 35, wherein a synthetic vision system is connected with said positioning/ground proximity warning system processor to provide said flight crew with an enhanced vision field display for the ground proximity warning, and a synthetic vision processing module is connected with said warning decision module, said terrain database, and said flight path plan aiding module for providing driving data for said synthetic vision system.

37. A positioning and ground proximity warning system for vehicle, as recited as claim 35, wherein a voice device is connected with said positioning/ground proximity warning system processor to provide said flight crew with audible ground proximity warning messages, and a voice processing module is connected with said warning decision module, said terrain database, and said flight path plan aiding module for providing driving data to said voice device.

38. A positioning and ground proximity warning system for vehicle, as recited as one of claims 34 to 37, wherein a bus-based structure is used for connecting said global position system, said inertial navigation system, said baro altimeter, said radio altimeter, said terrain database, said integrated positioning/ground proximity warning system processor, said synthetic vision system, said voice device and said onboard flight control and management system.

39. A positioning and ground proximity warning system for vehicle, as recited as one of claims 34 to 37, wherein said navigation solution module further comprises:

a correlation/matching, which accepts individual radio altimeter measurements from said radio altimeter, barometric altimeter measurements from said baro altimeter, and terrain data from said terrain database through said input/output module, and collects said individual radio altimeter measurements and barometric altimeter measurements to construct a measured profile of terrain in an assigned time window, and collected said terrain data to construct a set of prestored reference terrain profiles which correspond to the area over which the vehicle is flying during said assigned window time, and compared said measured terrain profile with said set of prestored reference terrain profiles, and outputs the geographic coordinates of the best matching reference profile to a filter/estimator; wherein said correlation/matching differencing a result of adding radio altimeter measurements with terrain height of the current vehicle position with the inertial altitude solution to form altitude measurement residuing to said filter/estimator, and said filter/estimator filtering said measurements for said global positioning system receiver, said inertial navigation solution from said inertial navigation system, and said geographic coordinates of said best matching reference profile and altitude measurement residuing from said correlation/matching to obtain optimal estimates of said inertial navigation solution errors, errors of the global position system receiver, and errors of inertial sensors in a centralized filtering fashion, and obtaining optimal navigation solution by compensating said inertial navigation solution from said inertial navigation system with said optimal estimates of said navigation solution errors, and feeding back said optimal estimates of said inertial navigation solution errors and said inertial sensor errors to calibrate the errors.

40. A positioning and ground proximity warning system for vehicle, as recited as one of claims 34 to 37, wherein said navigation solution module further comprises:

a correlation/matching, which accepts individual radio altimeter measurements from said radio altimeter, barometric altimeter measurements from said baro altimeter, and terrain data from said terrain database through said input/output module, and collects said individual radio altimeter measurements and barometric altimeter measurements to construct a measured profile of terrain in an assigned time window, and collected said terrain data to construct a set of prestored reference terrain profiles which correspond to the area over which the vehicle is flying during said assigned window time, and compared said measured terrain profile with said set of prestored reference terrain profiles, and outputs the geographic coordinates of the best matching reference profile to a TAINS local filter, wherein said correlation/matching differencing a result of adding radio altimeter measurements with terrain height of the current vehicle position with the inertial altitude solution to form altitude measurement residuing to said TAINS local filter;

said TAINS local filter modeling said inertial navigation solution errors and inertial sensor errors, and filtering said geographic coordinates of said best matching reference profile and altitude measurement residues to obtain a local optimal estimates of inertial navigation solution errors and inertial sensor errors, an INSGPS local filter inputting measurements from said global positioning system receiver and said inertial navigation solution from said inertial navigation system to obtain another local optimal estimates of inertial navigation solution errors, global position system receiver errors, and inertial sensor errors, a master filter receiving and filtering said local optimal estimates and covariance matrix of inertial navigation solution errors, errors of said global position system receiver, and errors of the inertial sensor from said INSGPS local filter and said local optimal estimates and covariance matrix of said inertial navigation solution errors and errors of said inertial sensor from said TAINS local filter, and providing global optimal estimates of said inertial navigation solution errors, said global position system receiver errors, and said inertial sensor errors, wherein said INSGPS local filter and said TAINS local filter accepts fed back said global optimal estimates of said inertial navigation solution errors, said global position system receiver errors, and said inertial sensor errors and said covariance matrix obtained by said master filter to reset said INSGPS local filter and said TAINS local filter and performs information-sharing among said master filter, said INSGPS local filter, and said TAINS local filter, said master filter performing a consistency test among the state estimates of said master filter, said INSGPS local filter and said TAINS local filter, to detect and isolate the malfunction of a satellite of said global positioning system and to reconfigure the structure and process of said navigation solution module, said master filter obtaining said optimal positioning solution compensating said inertial navigation solution from said inertial navigation system with said optimal estimates of said navigation solution errors, and feeding back said optimal estimates of said inertial navigation solution errors and said inertial sensor errors to calibrate the errors.

41. A positioning and ground proximity warning system for vehicle, as recited as one of claims 34 to 37, wherein said navigation solution module further comprises:

an individual terrain clearance computation accepts said inertial navigation solution from said inertial navigation system, said baro altitude measurement from said baro altimeter, said radio altitude measurement from said radio altimeter, and said terrain data from said terrain database, wherein said individual baro altitude measurements subtracting by a height of terrain at a current position to form a referenced individual terrain-clearance measurement, said radio altitude measurement is an individual measured terrain-clearance measurement, said individual terrain clearance computation outputting a deference between said measured terrain-clearance measurement and said referenced terrain-clearance measurement to a filter/estimator, said filter/estimator filtering said measurements for said global positioning system receiver, said inertial navigation solution from said inertial navigation system, and said difference between said measured terrain-clearance measurement and said referenced terrain-clearance measurement from said individual terrain clearance computation in a centralized filtering fashion to obtain optimal estimates of said inertial navigation solution errors, said global position system receiver errors, and said inertial sensor errors, wherein said filter/estimator is a nonlinear filter/estimator which obtains said optimal positioning solution by compensating said inertial navigation solution from said inertial navigation system with said optimal estimates of said navigation solution errors, and feeding back said optimal estimates of said inertial navigation solution errors and said inertial sensor errors to calibrate the errors.

* * * * *

UNITED STATES PATENT AND TRADEMARK OFFICE
CERTIFICATE OF CORRECTION

PATENT NO. : 6,157,891
DATED : December 05, 2000
INVENTOR(S) : Ching-Fang Lin

It is certified that error appears in the above-identified patent and that said Letters Patent is hereby corrected as shown below:

<u>Column 2,</u>
Line 35, after the "The above quote is from Ibid., P.279~P.281.", insert -- Further details about the quote can be referred to the U.S. DOT, Department of Transportation's IVHS Strategic Plan, Report to Congress (Washington, DC: U.S. DOT, December 1992), EDL No. 1823. --

Signed and Sealed this

Twelfth Day of February, 2002

*Attest:*

JAMES E. ROGAN
*Attesting Officer*  *Director of the United States Patent and Trademark Office*